United States Patent [19]

Sung et al.

[11] Patent Number: 5,594,660

[45] Date of Patent: Jan. 14, 1997

[54] PROGRAMMABLE AUDIO-VIDEO SYNCHRONIZATION METHOD AND APPARATUS FOR MULTIMEDIA SYSTEMS

[75] Inventors: Chih-Ta Sung, Princeton, N.J.; Tzoyao Chan, Saratoga, Calif.; Richard Chang; Mark A. Rosenau, both of San Jose, all of Calif.; Jeffrey G. Ort, Bellevue, Wash.; Daniel T. Daum; Yuanyuan Sun, both of San Jose, Calif.

[73] Assignee: Cirrus Logic, Inc., Fremont, Calif.

[21] Appl. No.: 316,015

[22] Filed: Sep. 30, 1994

[51] Int. Cl.$^6$ ................................................. G06F 17/00
[52] U.S. Cl. .................................................... 364/514 R
[58] Field of Search .......................... 364/514 R, 514 C; 395/153; 348/510, 512, 515, 423, 465; 370/100.1; 375/362, 375

[56] References Cited

U.S. PATENT DOCUMENTS

| | | | |
|---|---|---|---|
| 4,851,909 | 7/1989 | Noske et al. | 358/149 |
| 5,347,322 | 9/1994 | Levine et al. | 348/718 |
| 5,351,092 | 9/1994 | Poimboeuf et al. | 348/512 |
| 5,375,068 | 12/1994 | Palmer et al. | 364/514 R |
| 5,379,356 | 1/1995 | Purcell et al. | 382/56 |
| 5,381,181 | 1/1995 | Deiss | 348/423 |
| 5,396,497 | 3/1995 | Veltman | 370/100.1 |
| 5,430,485 | 7/1995 | Lankford et al. | 348/515 |
| 5,467,139 | 11/1995 | Lankford | 348/512 |

OTHER PUBLICATIONS

Iino et al.; "An Object–Oriented Model for Spatio–Temporal Shynchronization of Multimedia Information"; IEEE 1994.

Hodges et al. "A Construction Set for Multimedia Applications"; IEEE 1989.

Dave Bursky. "Improved DSP ICs Eye New Horizons," Nov. 11, 1993, *Electronic Design* vol. 41, No. 23, pp. 80–82.

Dave Bursky. "Codec Compresses Images in Real Time," Oct. 1, 1993, *Electronic Design* vol. 41, No.: 20, pp. 123, 124.

Lon McQuillin. "Multimedia and Video," Feb. 1991, *MacUser Buyer's Guide*, pp. 4–9.

Naohisa Ohta. *Packet Video*, published by Artech House 1994, pp. 137,138.

C–Cube Microsystems. "CL450™ MPEG Video Decoder User's Manual,"1992, Chapters 2 & 9, pp. 2–1 to 2–12 and 9–1 to 9–17.

*Primary Examiner*—Ellis B. Ramirez
*Attorney, Agent, or Firm*—William E. Alford; Steven A. Shaw; Robert Platt Bell & Associates

[57] ABSTRACT

A multimedia system including an audio/video decoder/decompresser for decoding/decompressing a compressed encoded audio/video data stream to generate video images for display and audio signals for audible reproduction. The multimedia system includes an integrated system and video decoder with an audio/video synchronization circuit for substancially synchronizing the display of video images with audio playback. A method is described for detecting when the playback of audio and the display of video images are out of synchronization. The circuitry includes three programmable registers, a finite state machine and one full adder using an audio presentation time stamp and the video presentation time stamp. The method uses a rounded programmable bias value which is compared with the difference between the video presentation time stamp and the audio presentation time stamps. The difference may included the latency delay of the audio and video display devices to more properly reflect the synchronization status between audio and video. The circuit area used by the circuitry has been minimized by selective rounding or truncation of the audio presentation time stamp and the video presentation time stamp without sacrificing the accuracy or speed of determining the synchronization between audio and video.

74 Claims, 13 Drawing Sheets

| Bit#:> SCLK: | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 768 | 0 | 0 | 0 | 0 | 0 | 0 | 0 | 0 | 1 | 1 | 0 | 0 | 0 | 0 | 0 | 0 | 0 | 0 |
| 1536 | 0 | 0 | 0 | 0 | 0 | 0 | 0 | 1 | 1 | 0 | 0 | 0 | 0 | 0 | 0 | 0 | 0 | 0 |
| 2304 | 0 | 0 | 0 | 0 | 0 | 0 | 1 | 0 | 0 | 1 | 0 | 0 | 0 | 0 | 0 | 0 | 0 | 0 |
| 3072 | 0 | 0 | 0 | 0 | 0 | 0 | 1 | 1 | 0 | 0 | 0 | 0 | 0 | 0 | 0 | 0 | 0 | 0 |
| 4608 | 0 | 0 | 0 | 0 | 0 | 1 | 0 | 0 | 1 | 0 | 0 | 0 | 0 | 0 | 0 | 0 | 0 | 0 |
| 5376 | 0 | 0 | 0 | 0 | 0 | 1 | 0 | 1 | 0 | 1 | 0 | 0 | 0 | 0 | 0 | 0 | 0 | 0 |
| 6144 | 0 | 0 | 0 | 0 | 0 | 1 | 1 | 0 | 0 | 0 | 0 | 0 | 0 | 0 | 0 | 0 | 0 | 0 |
| 7680 | 0 | 0 | 0 | 0 | 0 | 1 | 1 | 1 | 1 | 0 | 0 | 0 | 0 | 0 | 0 | 0 | 0 | 0 |
| 9216 | 0 | 0 | 0 | 0 | 1 | 0 | 0 | 1 | 0 | 0 | 0 | 0 | 0 | 0 | 0 | 0 | 0 | 0 |
| 10752 | 0 | 0 | 0 | 0 | 1 | 0 | 1 | 0 | 1 | 0 | 0 | 0 | 0 | 0 | 0 | 0 | 0 | 0 |
| 15360 | 0 | 0 | 0 | 0 | 1 | 1 | 1 | 1 | 0 | 0 | 0 | 0 | 0 | 0 | 0 | 0 | 0 | 0 |
| 18452 | 0 | 0 | 0 | 1 | 0 | 0 | 1 | 0 | 0 | 0 | 0 | 0 | 0 | 0 | 0 | 0 | 0 | 0 |
| Time:> | 1.46 | 740 | 370 | 182 | 91.2 | 45.6 | 22.8 | 11.38 | 5.69 | 2.84 | 1.42 | 712 | 356 | 178 | 88.88 | 44.44 | 22.22 | 11.11 |
| | sec | ms | ms | ms | ms | ms | ms | ms | ms | ms | ms | us | us | us | us | us | us | us |

FIG. 9

PROGRAMMABLE AUDIO-VIDEO SYNCHRONIZATION METHOD AND APPARATUS FOR MULTIMEDIA SYSTEMS

FIELD OF THE INVENTION

This invention relates generally to the field of multimedia systems. More particularly, this invention relates to a synchronization method and circuitry for a multimedia PC wherein the circuitry provides synchronization between audio playback and the video display. The invention is particularly suited for the Motion Picture Expert Group's (MPEG I+II) data compression and decompression standards.

BACKGROUND OF THE INVENTION

Personal computers have been adapted to run multimedia software applications which include audio and video information. Several multimedia specification committees have established and proposed standards for encoding/compressing and decoding/decompressing audio and video information. MPEG I and II, established by the Motion Picture Expert Group, are the most widely accepted international standards in the field of the multimedia PC software applications. Other standards are JPEG and Motion JPEG established by the Joint Photographic Expert Group. FIG. 1A illustrates an MPEG audio and video decoding system 120 which decompresses of the video and/or audio data compressed and coded according to the MPEG algorithm. The system decoder 110 reads encoded MPEG data stream 101, which may include interspersed compressed video and/or audio data, and generates timing information as Video Presentation Time Stamp (VPTS) 104, System Clock Reference (SCR) 105, and Audio Presentation Time Stamp (APTS) 106. The video decoder 111 decodes and decompresses the video data stream 102 and generates a decoded/decompressed video signal 107. The audio decoder 112 decodes and decompresses the audio data stream 103 and generates the decoded/decompressed audio signal 108. The decoded/decompressed video signal 107 is coupled to a PC monitor or other type of display while the decoded/decompressed audio signal 108 is coupled to an audio speaker or other audio generation means (not shown).

FIG. 1B, from page 49 of the ISO/IEC 11172-1:1993(E) International Standard specification for MPEG, incorporated herein by reference, illustrates a detailed diagram of how the data stream of encoded/compressed data may be encapsulated and communicated using packets. The data stream 160 may have different layers such as an ISO layer and a Pack layer. In the ISO layer a series of packages 161 are communicated until an ISO end code 164 is reached. Each package 161 may be defined as having a Pack Start Code 162 and Pack Data 163. At the pack layer, each package 161 may be defined as having a pack start code 162, a system clock reference 117, a system header 180, and packets of data 165–168. The ellipses 167 illustrates a number of packets. The system clock reference 117 may be further defined to be bit pattern 0010, three bits of X 185, bit pattern of 1, fifteen bits of Y 186, bit pattern 1, fifteen bits of Z 187, bit pattern 11, multiplexer rate 188, and bit pattern 1. The three bits of X 185, the fifteen bits of Y 186, and the fifteen bits of Z 187 make up a 33 bit pattern representing the system clock reference (SCR). The system clock reference represents the referenced system time. The multiplexer rate 188 represents how often audio packets are interspersed between video packets. Each packet 165–168 may be illustrated similar to packet 166. Packet 166 has a three byte packet start code prefix 170A, a one byte stream ID 170B, a two byte packet length 171, h-bytes of other header data 172, and N-bytes of packet data 173. The N-bytes of packet data 173 may represent audio or video data. In the case of using a compression/encoding method such as MPEG I, MPEG II, or JPEG, the data packets are encoded appropriately. The h-bytes of other header data 172 may comprise one to sixteen stuffing bytes 140, code bits 01 141, one bit flagging the standard buffer scale 142, thirteen bits indicating the standard buffer size 143, and one, five, or ten bytes of Time Stamp information 150 respectively representing nothing, a presentation time stamp (PTS), or a presentation time stamp (PTS) with a decoding time stamp (DTS). The presentation time stamp may be an audio presentation time stamp (APTS) if the following data packet 173 contains audio information. Alternatively it may be a video presentation time stamp (VPTS) if the following data packet 173 contains video information. In either of these cases the APTS or the VPTS may be represented by five bytes or 33 bits of information with 7 bits unused.

FIG. 3A illustrates a simplified example 315 of the encoded/compressed data stream 101 as compared to FIG. 1B. An encoded/compressed data stream such as this may contain a plurality of encoded/compressed video data packets or blocks and a plurality of encoded/compressed audio data packets or blocks. MPEG encodes/compresses the video packets based on video frames which may also be referred to as pictures. Three types of video frames may be used. An intra-frame or I-type frame or picture is a frame of video data which is coded using information about itself. Only one given noncompressed video frame is encoded/compressed into one I-type frame of encoded/compressed video data. A predictive-frame or P-type frame or picture is a frame which is encoded/compressed using motion compensated prediction from a past reference frame. A previous encoded/compressed frame, such as I-type or P-type is used to encode/compress a current noncompressed frame of video data into a P-type frame of encoded compressed video data. A bi-directional-frame or B-type of frame or picture is a frame which is encoded/compressed using a motion compensated prediction from a past and future reference frame, or a past, or a future reference frame of video data. A reference frame may be either an I-type frame or a P-type frame. B-type frames are usually inserted between I-type, P-type, or combinations or either when there is fast motion within an image across frames. Motion compensation refers to using motion vectors from one frame to the next to improve the efficiency of predicting pixel values for encoding/compression and decoding/decompression. The method of prediction uses the motion vectors to provide offset values and error data which refer to a past or a future frame of video data having decoded pixel values which may be used with the error data to compress/encode or decompress/decode a given frame of video data. Because the amount of data required to display an image which may display motion and have varying resolutions and frame rates is greater than the amount of data required reproduce audio sounds, the video data packets such as 303–305 occur more frequently within the MPEG data stream than audio data packets such as 311. The infrequent interspersion of audio data packets between the video data packets may cause an image frame to be displayed before or after the audio has been reproduced. Time stamps are provided within the encoded/compressed data stream to facilitate the synchronization of audio and video. The video presentation time stamps 300–302 are provided at various intervals 306–308 of a given system time clock 316. The audio presentation time stamps exemplified by 310 are also provided at various intervals 312 of the MPEG data stream. Additionally, there is a system clock reference (SCR) 317 provided at various intervals 318. Each of these SCR, VPTS, and APTS are 33 bit values representing a time value. The MPEG standard recommends that the MPEG decoder use the 33-bit VPTS as the starting time of the video display sequence and the 33-bit APTS for the starting time of the audio playback sequence. The APTS and VPTS may jointly be referred to as presentation time stamps (PTS). The MPEG standard requires that a APTS, VPTS, and SCR show up in the bitstream at least once every seven tenths (0.7) of a second.

In the prior art, the 33-bit system clock reference (SCR) has been used as the reference time for both video and audio display to minimize the deviation between video and audio playback. The SCR was loaded into a counter, referred to as the system counter, and incremented by a 90 kilohertz system clock (SCLK). The output of the system counter was compared with the VPTS within the video decoder 111 and the APTS within the audio decoder 112 to determine by how much the audio or video playback was out-of-sync. If a threshold level was reached, the video would jump to be correctly in sync with the audio. Thus, the SCR is used to resynchronize the video playback with the audio playback. In some decoding systems, a video clock or decoding clock is generated without reference to the SCR and it is not locked or corrected such that a time drift (lead or lag) may appear in the synthesized VPTS derived from the video or decoding clock. This time drift may cause in one second, or 90000 system clock cycles, time errors on the order of 50 parts per million. This is equivalent to the synthesized VPTS values differing from actual VPTS values by 44 to 67 usecs. In systems which do not correct for out-of-sync conditions, the time error may accumulate and cause the video image to lead or lag the audio playback by 1 frame every 5 to 6 minutes. The frame lead or lag may also accumulate over larger periods of time if the video display and the audio playback are not occasionally resynchronized.

SUMMARY AND OBJECTS OF THE INVENTION

A multimedia system includes an audio/video decoder/decompresser for decoding/decompressing an encoded/compressed audio/video data stream in order to generate video images for display on a display device and to generate audio signals for audible reproduction. The multimedia system includes an integrated system and video decoder with an audio/video synchronization circuit for substantially synchronizing the display of video images with audio playback. A method is described for detecting when the playback of audio and the display of video images are out of synchronization.

A portion of a multimedia system encodes/compresses audio sounds and video images into a encoded/compressed bit stream which contains time information, encoded/compressed packets of video data, and encoded/compressed packets of audio data. The encoded/compressed bit stream may be recorded onto a CDROM or other storage device for later reproduction or it may be directly transferred to the reproduction portion of the multimedia system for present display of video images and audio playback.

The reproduction portion of the multimedia system may include a compact disk read-only-memory reader, a processor circuit, an audio/video decoder circuit, audio speakers for sound generation, and one or more display devices to display images which may correspond to the sound reproduction.

The audio/video decoder circuit may contain an integrated circuit which includes a system decoder, a video decoder, FIFO buffers, a memory interfacing means, and an audio/video synchronization circuit. The audio/video synchronization circuit detects an out of synchronization condition between audio and video and then either causes video frames or fractions thereof to be skipped or repeated in order to synchronize the video display of images to the audio playback. Alternatively the audio/video synchronization circuit may cause audio data or fractions thereof to be skipped or delayed in order to synchronize the audio playback to the video display of images.

The method of detecting an out of synchronization condition between audio and video includes determining a time difference between receiving a video time value and an audio time value within the encoded/compressed audio/video data stream, adding the time difference to the video time value to generate a corrected video time value, and comparing the corrected video time value with the audio time value to determine whether the audio playback is leading the video display by a lead threshold or if the audio playback is lagging the video display by a lag threshold.

An alternate method includes determining a time difference between receiving an audio time value and a video time value within the encoded/compressed audio/video data stream, adding the time difference to the audio time value to generate a corrected audio time value, and comparing the corrected audio time value with the video time value to determine whether the video display is leading the audio playback by a lead threshold or if the video display is lagging the audio playback by a lag threshold.

It is an object of the invention to provide improved audio and video synchronization.

It is a further object of the invention to decrease the cost of a multimedia system by decreasing the number and size of circuits needed to perform audio/video synchronization.

It is a further object of the invention to provide a flexible synchronization apparatus in a multimedia system which may adapt to various media having different synchronization requirements which may be received by a multimedia system having different frame rates and clock rates.

It is a further object of the invention to provide a flexible apparatus in a multimedia system having a selectable resolution for accuracy in synchronization.

BRIEF DESCRIPTIONS OF THE DRAWINGS

FIG. 9 illustrates a binary table of selected offset values and the respective time for each bit to determine truncation.

DETAILED DESCRIPTION OF THE INVENTION

Figure 1A:
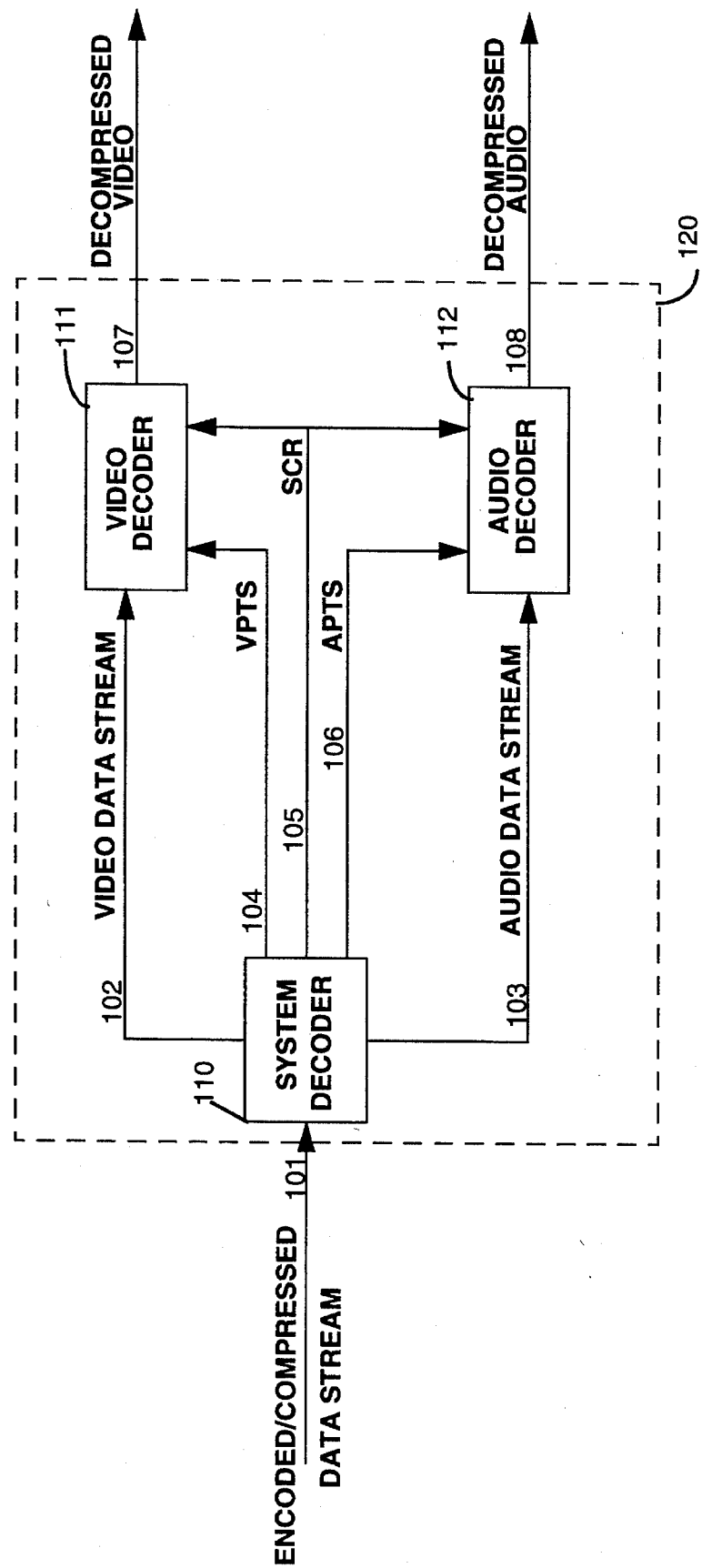
FIG. 1A shows a prior art block diagram of an MPEG decoding system.
Figure 1B:
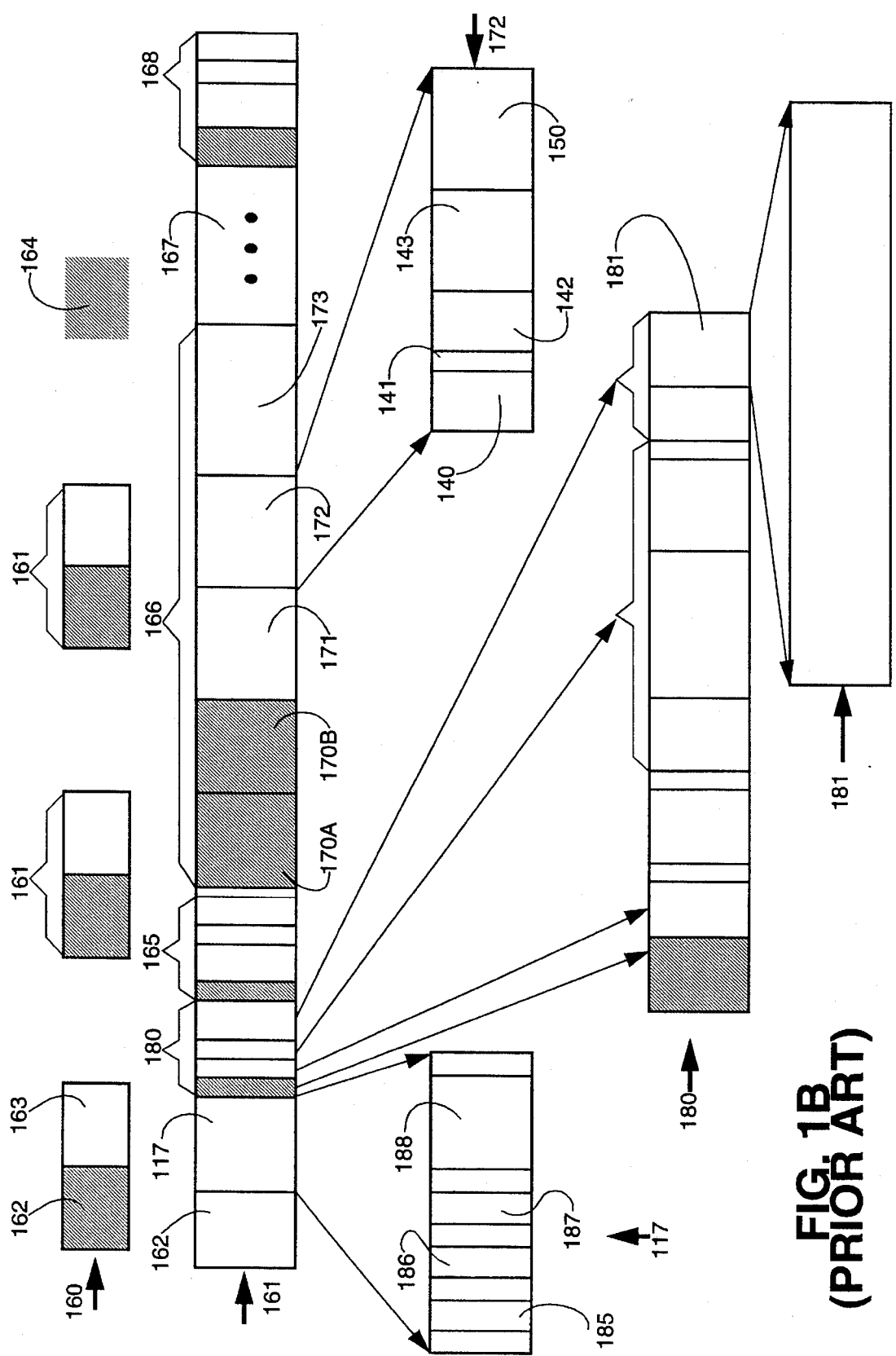
FIG. 1B shows a prior art encoded data stream format for serial transmission of audio and video data.
Figure 2:
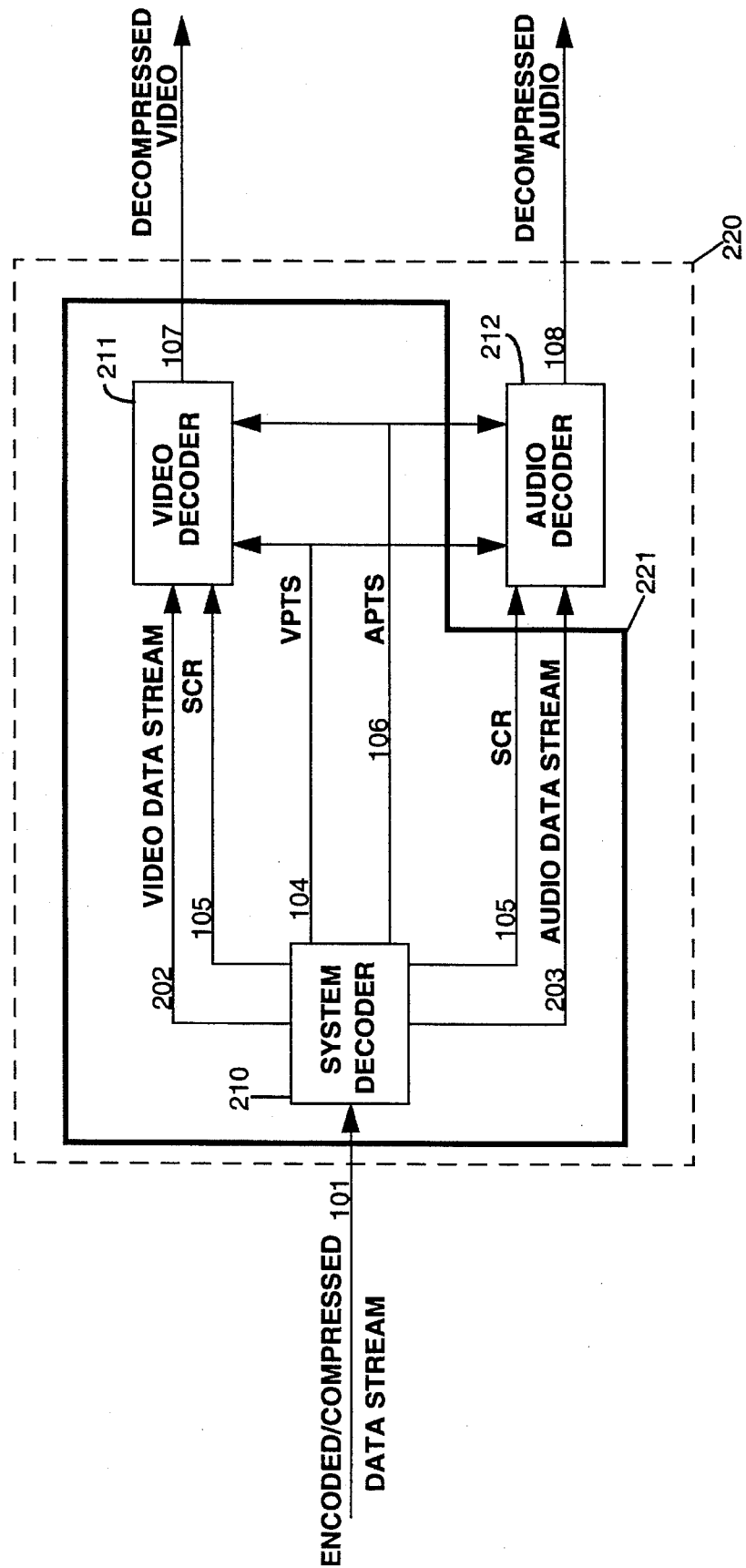
FIG. 2 shows a block diagram of an MPEG decoding system which includes the circuit and algorithm of the present invention.
Figure 4A:
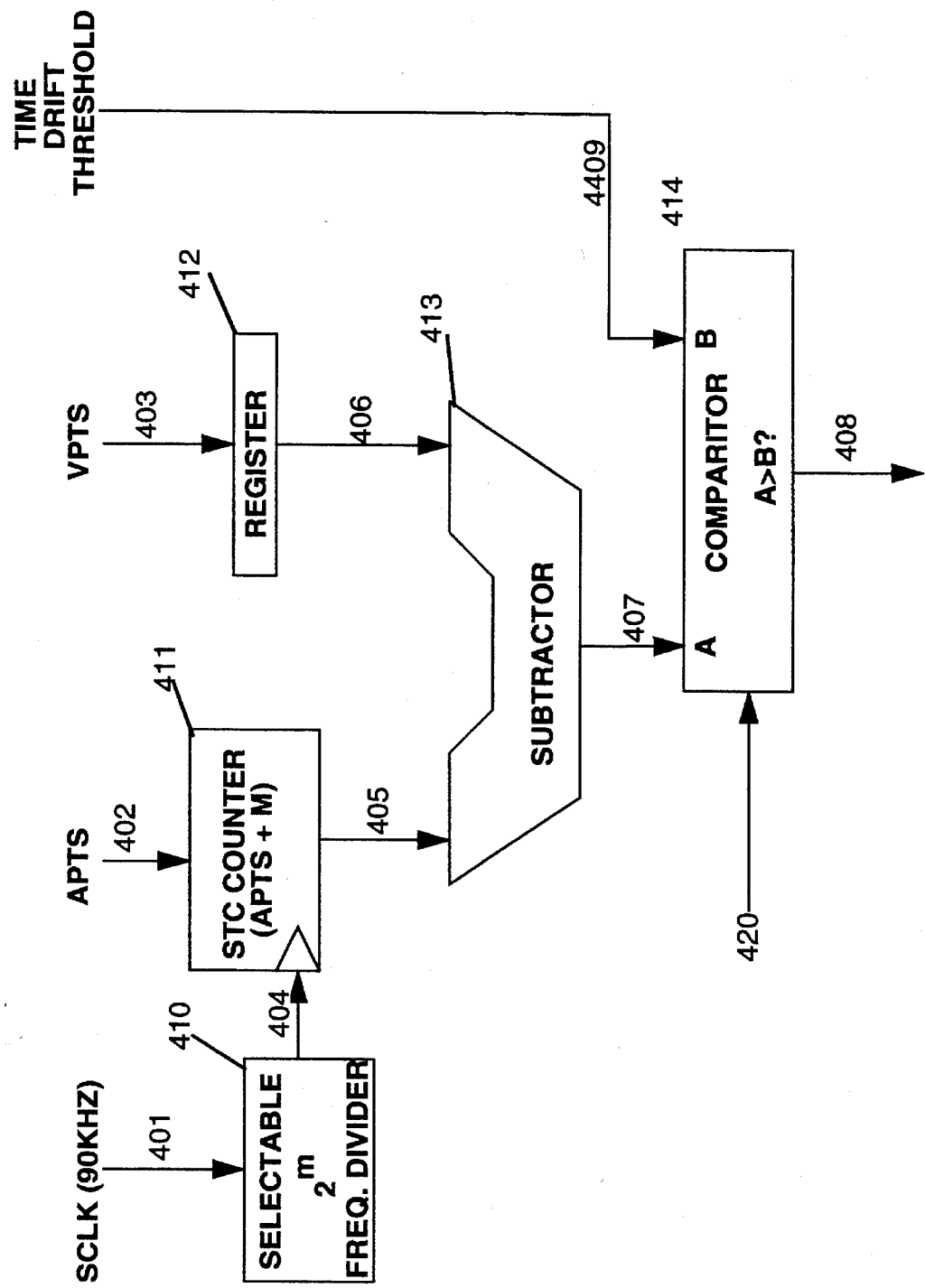
FIG. 4A illustrates a simplified block diagram for the logic of the preferred embodiment of the present invention.
Figure 4B:
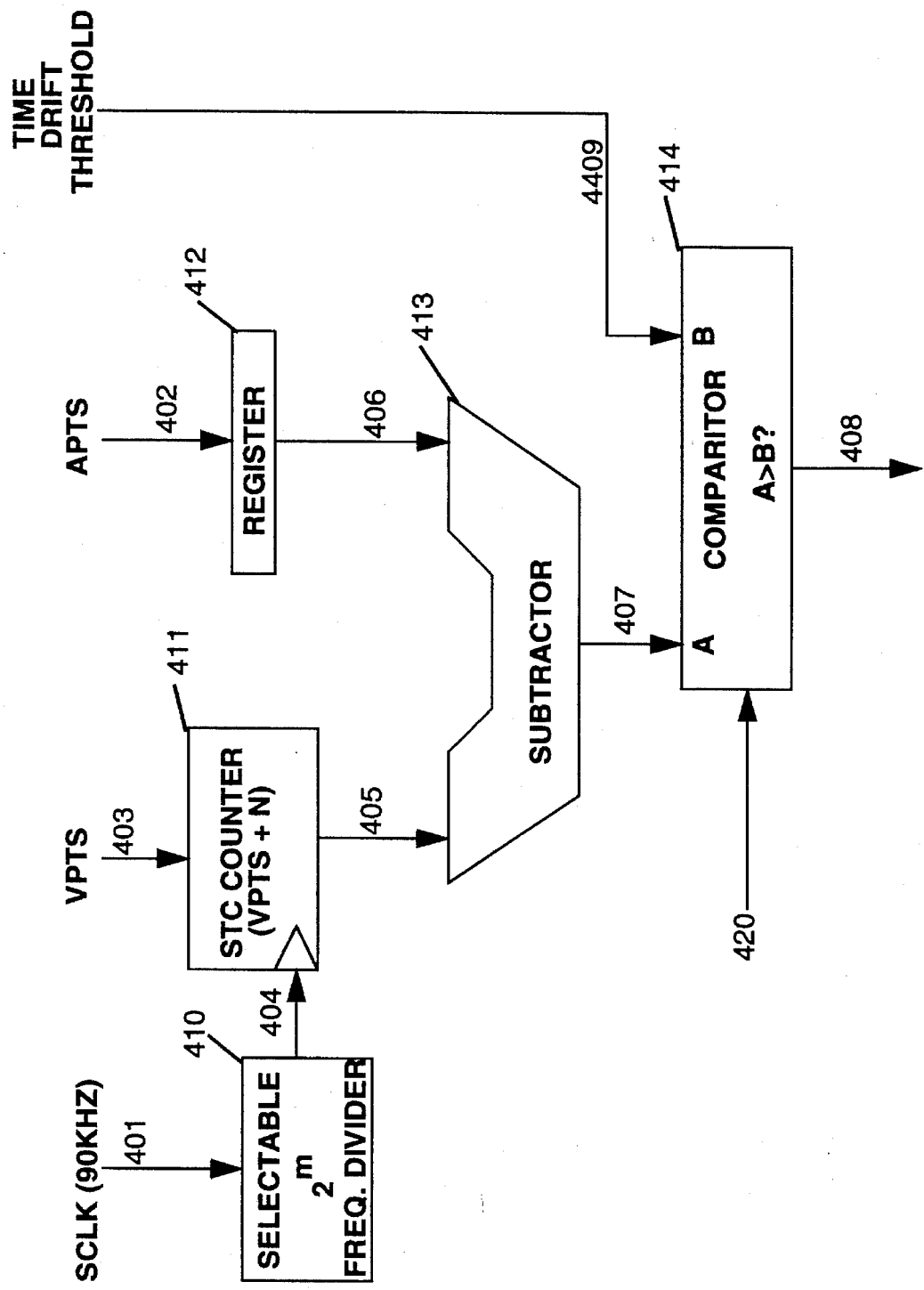
FIG. 4B illustrates a simplified block diagram for the logic of a second embodiment of the present invention.

In the prior art of FIG. 1A, the video presentation time stamp (VPTS) 104 was compared against the SCR 105 to determine time drift. Referring to FIGS. 2 and 4A–4B, the present invention compares the VPTS (104 or 403) with the APTS (106 or 402) to determine time drift and correctly match the video frame to the audio playback. To accomplish this comparison, a monolithic integrated circuit, referred to herein as a "Vidsyst" (VideoSystem) Decoder, may include the algorithm and circuitry of the present invention.

FIG. 2 illustrates a simplified block diagram of an MPEG audio/video decoder system which includes the Vidsyst decoder 221. The Vidsyst decoder 221 has a system decoder 210 which receives the MPEG data stream 101 and parses the video data packets from the audio data packets as well as the timing information (VPTS 104, SCR 105, APTS 106) from the data packets. The video data packets are sent as a video data stream 202 to the video decoder 211. The timing information (VPTS 104, SCR 105, APTS 106) parsed from the MPEG data stream 101 by the system decoder 210 is sent internally to the video decoder 211 as well as externally from the Vidsyst decoder 221 to the audio decoder 212. The video data packets within the video data stream 202 are decoded and decompressed within the video decoder 211 to generate decoded/decompressed video data 107. Within the video decoder 211 of the Vidsyst decoder 221, there is an A/V sync circuit (not shown) which compares the VPTS to the APTS to determine the time drift.

The A/V sync circuit further controls the generation of decoded/decompressed video to resynchronize the video image displayed with the audio playback in response to the time drift exceeding predetermined limits. The audio data packets parsed by the system decoder 210 within the Vidsyst decoder 221 are sent externally as an audio data stream 203 to the audio decoder 212. The audio decoder 212 may also be a monolithic integrated circuit such as a DSP chip or a dedicated audio decoder such as the CS4920 manufactured by Crystal Semiconductor. The audio decoder 212 need not provide synchronization because as synchronization may be performed entirely by the Vidsyst decoder 221. However in other applications, the circuitry of the present invention may be included within the audio decoder 212.

REPEATING AND SKIPPING FRAMES FOR RESYNCHRONIZATION

Figure 3A:
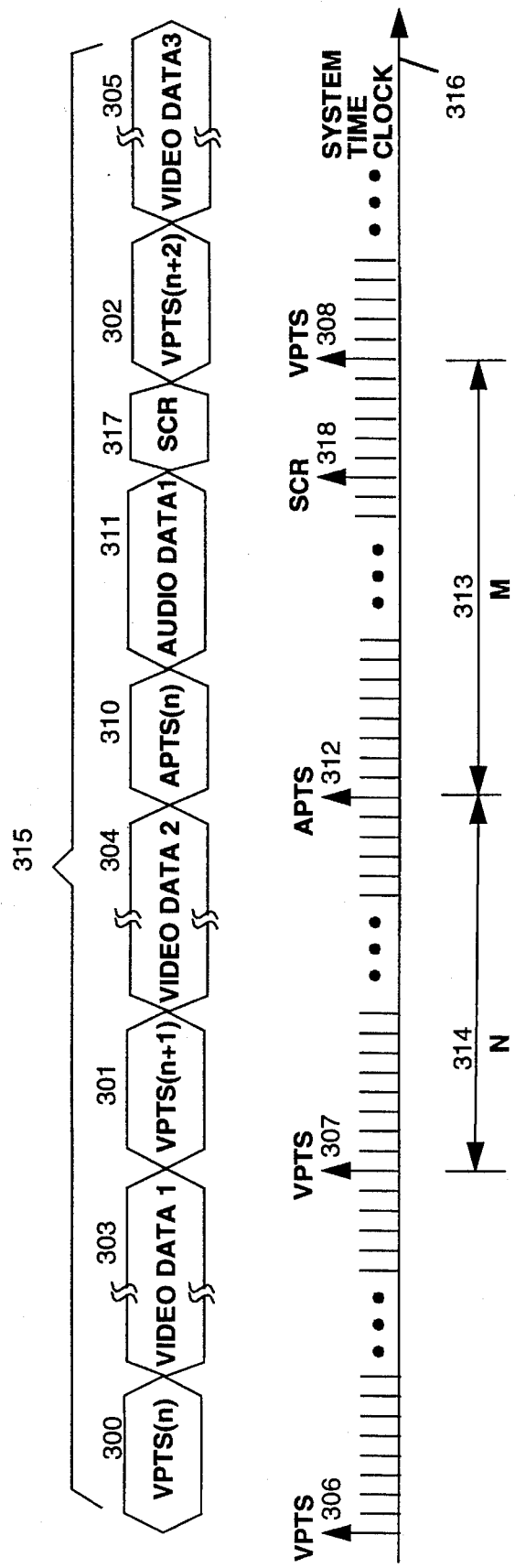
FIG. 3A illustrates a simplified waveform diagram and system timing for the MPEG data stream as illustrated in FIG. 1B.
Figure 3B:
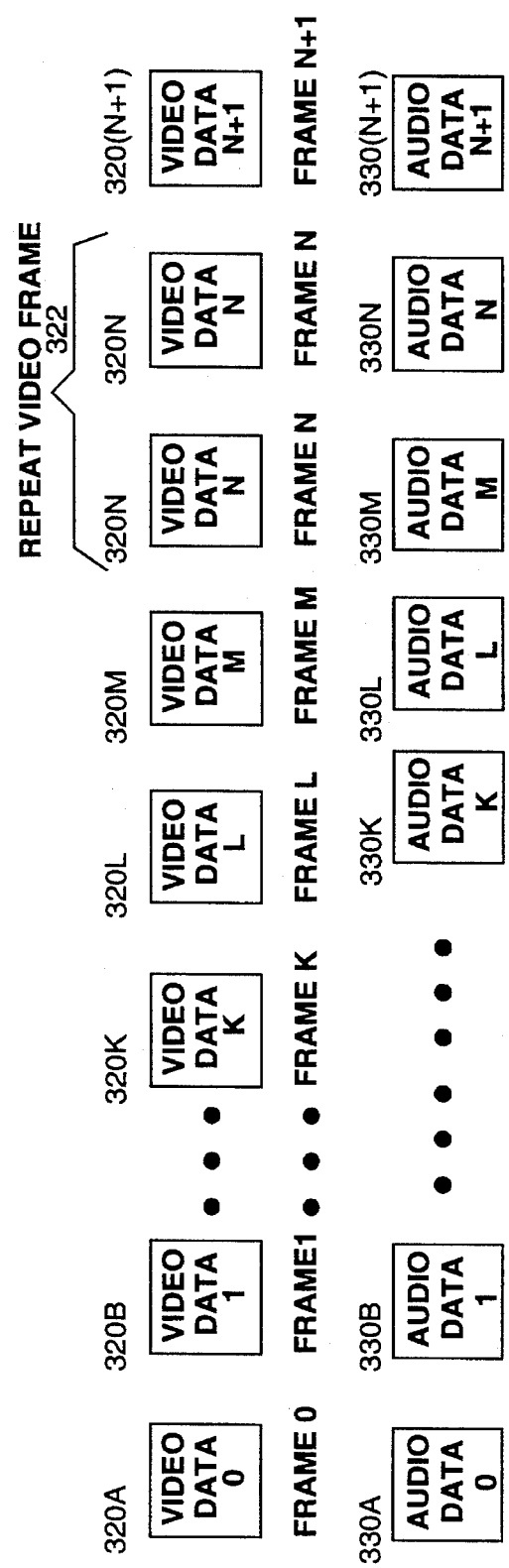
FIG. 3B is a diagram illustrating how a leading video frame is resynchronized with the audio data.
Figure 3C:
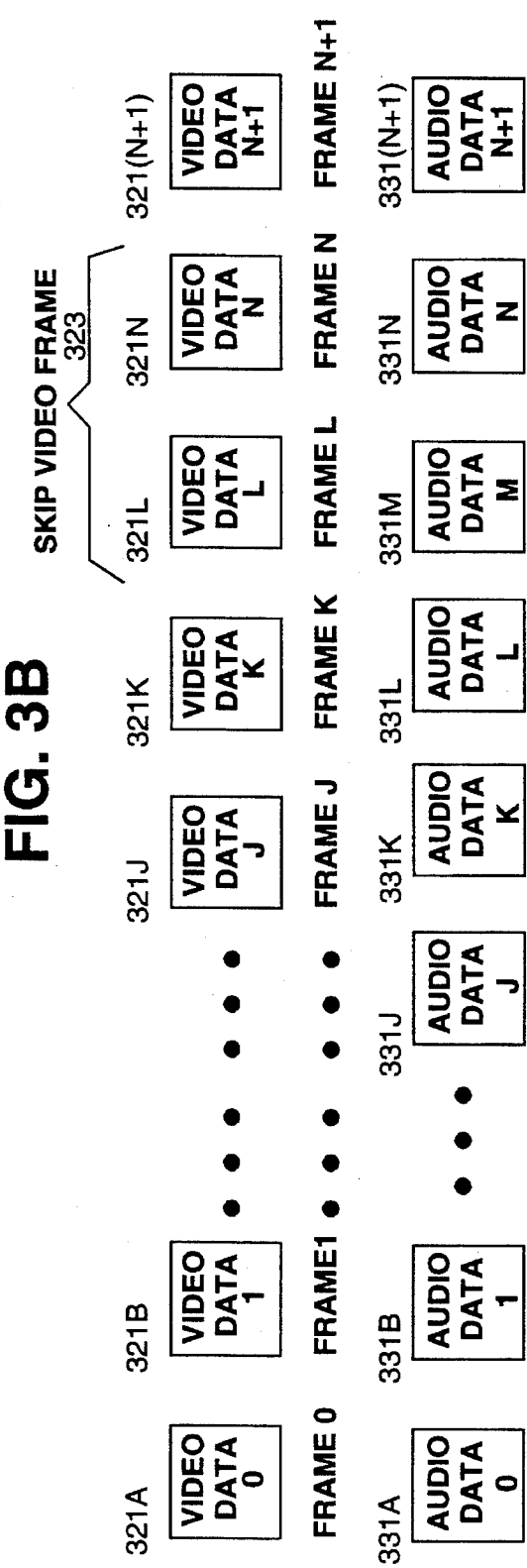
FIG. 3C is a diagram illustrating how a lagging video frame is resynchronized with the audio data.

FIGS. 3B and 3C illustrate how the video display is resynchronized to the audio playback by the present invention. Referring to FIG. 3B, the video display over time is illustrated by the sequence of video data frame(0) 320A to video data frame(N+1) 320(N+1). The audio playback over time is illustrated by the sequence of audio data(0) 330A to audio data(N+1) 330(N+1). FIG. 3C is similarly illustrated. In FIG. 3B the video data frame leads the audio data such that in order to resynchronize the video data frame with the audio data, a video data frame is repeated in order to allow the audio to catch up. Assume initially that the video data frame(0) 320A and the audio data(0) 330A are in complete synchronization. Over time the video data frame(K) 320K leads the audio data(K) 330K. Once a lead threshold—such as one or one half frame—is reached, the A/V sync circuit causes the video frame (or half frame as the case may be) to be repeated. In FIG. 3B a one frame lead threshold is reached wherein the video data frame(M) 320M leads the audio data(M) 330M by one frame such that the next video data frame(N) 320N is repeated on the video display as illustrated by the repeat video frame 322. Thus the video data frame(N) 320N is resynchronized with the audio data(N) 330N.

Referring to FIG. 3C, the video data frame lags the audio data such that in order to resynchronize the video data frame with the audio data, a video data frame is skipped. Initially the video data frame(0) 321A and the audio data(0) 331A are in complete synchronization. Over time the video data frame(J) 321J lags the audio data(J) 331J. Once a lag threshold—such as one or one half frame—is reached, the A/V sync circuit causes a video frame (or half frame as the case may be) to be skipped. In FIG. 3C a one frame lag threshold is reached wherein the video data frame(L) 320L leads the audio data(N) 331N by one frame such that the next video data frame(M) (not shown) is skipped on the video display as illustrated by the skipped video frame 323. In place of video data frame(M) the video data frame(N) 321N is displayed when the audio data(N) 331N is played. Thus, the video data frame(N) 321N is resynchronized with the audio data(N) 331N.

FIGS. 3B and 3C illustrate repeating or skipping one whole frame. Repeating one half frame may require holding the upper half of a frame the same while updating the lower half of the frame with the according portion of a new frame of data. Skipping one half frame may require updating the lower half of the frame with the according half of the current frame of data while updating the upper half of the frame with the according portion of the next frame of data. FIGS. 3B and 3C are only exemplary of skipping and repeating a single video data frame as multiple frames may be skipped or repeated. If the audio and video are out of sync by more than one frame it may be desirable to skip or repeat multiple frames. In certain applications, a user may select to freeze or repeat a video data frame while allowing the audio data to be continually reproduced and audible. In another case, the user may desire to fast forward by skipping multiple frames or pause and step through a number of video data frames. In either case, it may be desirable to mute the audio data and then resynchronize the video with the audio track once the desired video data frame has been found in which to start normal playback.

FIGS. 3B and 3C only illustrate the video display of images being skipped or repeated. To skip frames of the video display of images, it is preferable that encoded/ compressed video data frames be skipped in order to resynchronize the video display with the audio playback. To repeat frames of the video display of images, it is preferable that decoded/decompressed video data frames be repeated in order to resynchronize the video display with the audio playback. Alternatively packets of audio data may be skipped or delayed in order to resynchronize the video display with the audio playback.

Skipping encoded/compressed frames of video or delaying encoded/compressed packets of audio data prior to decoding/decompression, more efficiently uses memory and may be more effective in resynchronization. Skipping decoded/decompressed frames of video requires a larger memory and is less effective in resynchronization. Repeating encoded/compressed or decoded/decompressed audio data packets is more audibly perceptible than is delaying encoded/compressed packets of audio data or decoded/decompressed audio data packets. For encoded/compressed video, an I-type frame requires approximately 20K bytes of memory, a P-type frame requires approximately 10K bytes, and a B-type frame requires approximately 3K bytes.

A requirement of MPEG decoding may limit the type of encoded/compressed frames of video which may be skipped. The capability to decode/decompress P-type frames from the previous I-type frame normally requires that only B-type frames are skipped, with the exception of the last P-type frame immediately preceding an I-type frame.

For example consider the encoded/compressed data stream to have the following frame sequence $I_1B_2B_3P_4B_5P_6B_7P_8B_9B_{10}P_{11} \ldots P_{n-3}B_{n-2}P_{n-1}I_n$ where B represents a B-type encoded frame, P represents a P-type encoded frame and I represents an I-type encoded frame of video. To decode a predicted or P-type frame, prior decoding of an I-type frame may be required. Thus, $P_4$ may require $I_1$ to be decoded first such that the encoded/compressed $I_1$ frame may not be skipped by the hardware. Similarly, the frame $P_6$ may require that $P_4$ be available in order to decode/decompress frame $P_6$. Thus $P_4$ may not be skipped either. While frame $B_3$ requires both $P_4$ and $I_1$, the B-type frames are inserted frames between I-type, P-type, or a combination during encoding and are not necessary to a faithful reproduction of an image. The last P-type frames before an I-type frame, such as $P_{n-1}$ in the example, may be skipped as well. No future frame relies on having $P_{n-1}$ available in order to be decoded/decompressed.

Hardware which skips decoded/decompressed frames may not have this limitation but may require larger amounts of memory. Software methods which skip encoded/compressed frames may not have such limitation because software may predecode to determine frame types. However software methods do not operate in a real-time fashion as do hardware methods.

FUNCTIONALITY OF THE SYNCHRONIZATION CIRCUIT

In synchronizing the video and audio, it may be desirable to provide a frame synchronization resolution of plus or minus one half frame or a multitude thereof. In this manner, decoding encoded/compressed data having one half frame of time drift provides a well synchronized reproduction of video images and audio playback. For the purposes of illustration, the operation of the present invention will be described using the MPEG I compression/encoding standard. It can be appreciated that the present invention may be modified to support other compression/encoding standards such as MPEG II and motion JPEG.

In order to compress/decode the MPEG encoded/compressed bit stream, the MPEG standard recommends a ninety kilohertz clock frequency be used as the system reference clock (SCLK) for any decoding circuitry. A system reference clock frequency of ninety kilohertz is equivalent to a clock period of 11.11 microseconds. The video display rate or frame rate, which is the number of image frames displayed on a monitor or like device over a period of time, may vary. A frame rate of 60 frames per second (fps) is sometimes referred to as real time because the human eye through its averaging properties sees the display having smooth and normal motion as opposed to flickered motion. A frame rate of 30 fps requires less data than that of 60 fps to be displayed on a screen but does not have as smooth and normal motion and appears somewhat flickered. A frame rate of 30 fps is considered ideal for CDROMs and multimedia applications—balancing the data requirements against the image quality. A frame rate of 30 fps is equivalent to displaying one image frame for approximately 33.33 milliseconds on a display device. For a synchronization resolution of one half frame, an allowable time drift may be approximately one half of 33.33 milliseconds or 16.67 milliseconds. In the time period of 16.67 milliseconds, the system clock (SCLK) would have gone through approximately 1500 cycles. Thus a resolution of one half frame synchronization may require a time drift of less than 1500 SCLK clock cycles. Through similar reasoning, if a resolution of one half frame synchronization for a frame rate of 60 fps is desired, the time drift should be approximately 750 SCLK clock cycles. If the resolution for 30 fps is 2.5 frames, the allowable time drift should be 5 times the time drift of one half frame of 1500 SCLK clock cycles or 7500 SCLK clock cycles. Similarly, if the resolution for 30 fps is one frame, the allowable drift may be twice that of the one half frame of 1500 SCLK clock cycle which equals 3000 SCLK clock cycles. Accordingly, 3 frames of time drift for 30 fps may be equivalent to 9000 SCLK clock cycles. Summarizing, the time drift for 30 fps of one half frame, one frame, 2.5 frames, and 3 frames may respectively be 1500, 3000, 7500, and 9000 SCLK clock cycles. For 60 fps, a time drift of one half frame, one frame, 2.5 frames, and 3 frames may respectively be 750, 1500, 3750, and 4500 SCLK clock cycles. In the present invention, the system clock (SCLK) may be used to determine time drift.

The present invention may use the difference between the VPTS and the APTS in order to determine an out-of-sync condition. Referring to FIG. 3A, the system clock time line 316 illustrates the incremental clock cycles of the system clock SCLK. MPEG bit stream 315 illustrates an example of an MPEG bit stream. The occurrence of the VPTS (306–308), APTS 312, and SCR 318 timing information within the MPEG bit stream 315 coincides with a given clock cycle number of SCLK. As illustrated in FIG. 3A, there may be a latency in the occurrence of VPTS 308 from the occurrence of APTS 312. The number of SCLK clock cycles for the latency between receiving VPTS 307 and APTS 312 is the value N 314. The number of SCLK clock cycles for the latency between receiving APTS 312 and VPTS 308 is the value M 313.

For example, consider FIGS. 3A and 4A where a counter 411 counts the value M 313 and a register 412 is eventually stored with the value of VPTS 308. Upon the occurrence of the APTS 312, the counter 411 counts the number of SCLK clock cycles which occur before receiving the VPTS 308. In this manner the number of counts counted by counter 411 represents the value of M 313. The value of N may be similarly counted by the block diagram in FIG. 4A.

APTS and VPTS are 33 bit time stamp values. Thus, for example, APTS 312 may have a time stamp value of 2 PM, 6 min, 5.110 sec and VPTS 308 may have a time stamp value of 2 PM, 6 min, 5.290 sec. Comparing these two time stamps the VPTS 308 has a later time value than the APTS 312. In order to properly compare whether the video leads or lags the audio the APTS must be normalized or corrected to the later occurring VPTS. Thus the latency value M needs to be added to the APTS in order have the same frame of reference. Note that a time drift threshold of one half frame time at 30 fps is approximately 16.67 ms or 0.01667 seconds.

In case one, assume that M has a time value of 0.166 sec. Adding M to the APTS value provides (APTS+M)=2 PM, 6 min, 5.176 sec, which is the normalized APTS value. Comparing the sum of the normalized APTS value to the VPTS value of 2 PM, 6 min, 5.290 sec, the video leads the audio by 0.114 sec. (i.e. VPTS−(APTS+M) =0.114 sec.) Thus, the VPTS is greater than the normalized APTS, (APTS+M), by 0.114 seconds. If played on a multimedia system, the user may visualize an older frame of video and hear the audio which matches an earlier frame of video such that the video display of images leads the audio playback, such as illustrated by frame 320N and frame 330M of FIG. 3B. Alternatively, it may be said that the audio lags the video; however, it is preferable to use the audio data as the frame of reference. Thus it would be desirable to slow down the video or hold and repeat a video frame to allow the audio data to age and match the given video frame.

In case two, assume that M has a time value of 0.333 sec such that (APTS+M)=2 pm, 6 min, 5.443 sec. Comparing the normalized APTS to the VPTS value of 2 pm, 6 min, 5.290 sec by performing (APTS+M)−VPTS, the result equals 0.153 sec. Note that because the value of (APTS+M) has a later time stamp than does the VPTS, the video lags the audio. If played on a multimedia system, the user may visualize an earlier frame of video and hear the audio of a later frame of video, such as illustrated by frame 321L and frame 331M of FIG. 3C. Thus it may be desirable to jump or skip frames of video to age the video frame to substantially match the audio.

The value of N similarly normalizes the preceding VPTS 307 to enable a comparison of (VPTS+N) with the following APTS 312. In cases where the video lags the audio and exceeds a time drift threshold, it may be desirable to have the display of video substantially match the audio by skipping frames of video data or fractions thereof.

Using whole frames to skip or repeat may be preferable for reducing circuit complexity as a video display leading or lagging audio playback by fractions of a frame may not be perceptible.

Thus the calculation of VPTS−(APTS+M) is performed if VPTS is greater than the normalized APTS value or the calculation of (APTS+M)−VPTS is performed if VPTS is smaller than the normalized APTS value. Similarly, the calculation of APTS−(VPTS+N) is performed if APTS is greater than the normalized VPTS value or the calculation of (VPTS+N)−APTS is performed if APTS is smaller than the normalized VPTS value for cases where N is used. In either case, it may be desirable after determining the results of these two operations to determine how many frames or fractions of frames the video display leads or lags the audio playback. The number of frames may be determined by comparing the results of the calculations to predetermined time drift thresholds. A time drift threshold may represent a frame time or fraction thereof in the number of SCLK clock cycles within a given number of frames or fractions thereof for a given display rate. Particularly, time drift thresholds of plus and minus one half frame time, one frame time, two and one half (2.5) frame times, and three frame times may be of interest. As discussed above, one half frame time was determined to be 1500 SCLK clock cycles, one frame time was 3000 SCLK clock cycles, 2.5 frame times was 7500 SCLK clock cycles, and 3 frame times was 9000 SCLK clock cycles for a display rate of 30 fps. For a display rate of 60 fps, these time drift threshold values may be cut in half to become 750, 1500, 3750, and 4500 SCLK clock cycles respectively. It can be appreciated that other threshold values may be selected without departing from the spirit and scope of the present invention.

FIG. 4A illustrates a functional block diagram of circuitry for performing the computations of VPTS−(APTS+M) if VPTS is greater than (APTS+M) and (APTS+M)−VPTS if VPTS is smaller than (APTS+M) as well as the comparison of the results against various time drift threshold values. FIG. 4B illustrates a functional block diagram of circuitry for performing the computations of APTS−(VPTS+N) if APTS is greater than (VPTS+N) and (VPTS+N)−APTS if APTS is smaller than (VPTS+N). In comparing the time drift threshold against the results of these computations, logically the coarser frame time resolutions (time drift thresholds) such as plus and minus 3 frame times should be computed first and the finest frame time resolution (time drift thresholds) such as plus and minus one half frame time should be computed last. Referring to FIG. 4A, when an APTS is detected within the encoded/compressed data stream the STC counter 411 is set and loaded with a binary value representing the detected APTS at counter input 402. Depending upon how the STC counter 411 counts, the SCLK clock frequency is divided. Assuming that the STC counter 411 counts by one, such that the SCLK frequency of 90 khz on line 401 is divided by one in frequency divider 410 generating the same frequency for the counter clock input 404. As the STC counter 411 is incremented, the value for M is being generated. Upon reaching a VPTS, the generation of M for the detected VPTS is completed and the counter output 405 reflects the computation of (APTS+M). When a VPTS is detected within the encoded/compressed data stream, the register 412 is loaded with the binary value representing the detected VPTS at register input 403. The subtracter 413 computes (APTS+M)−VPTS from the value of (APTS+M) at subtracter input 405 and the value of VPTS at subtracter input 406. The results output from subtracter 413 on bus 407 are compared with the time drift threshold provided on bus 409 by comparator 414 at appropriate times by the comparator enable input signal 420. As discussed above, the coarse time drift thresholds are compared first such that the following sequence of equations is performed by the comparator 414 for a display rate of 30 fps:

Eq. (A) If (APTS+M)−VPTS<−9000 then video leads audio by at least 3 frames so repeat video frames and if not then Eq. (B) If (APTS+M)−VPTS>9000 then video lags audio by at least 3 frames so skip video frames and if not then perform the next finer resolution steps Eq. (C) If (APTS+M)−VPTS<−7500 then video leads audio by at least 2.5 frames but not more than 3 so repeat video frames and if not then Eq. (D) If (APTS+M)−VPTS>7500 then video lags audio by at least 2.5 frames but not more than 3 so skip video frames and if not then perform the next finer resolution steps Eq. (E) If (APTS+M)−VPTS<−3000 then video leads audio by at least one frame but not more than 2.5 so repeat video frames and if not then Eq. (F) If (APTS+M)−VPTS>3000 then video lags audio by at least one frame but not more than 2.5 so skip video frames and if not then perform the next finer resolution steps Eq. (G) If (APTS+M)−VPTS<−1500 then video leads audio by at least one half frame but not more than one frame so repeat video frames and if not then Eq. (H) If (APTS+M)−VPTS>1500 then video lags audio by at least one half frame but not more than one frame so skip video frames and if not then perform the next finer resolution steps else stop if there are no more finer resolution steps and the actual time drift is less than the last tested frame time of plus or minus one half frame.

For a display rate of 60 fps, the time threshold values are cut in half to determine the same results. For example, Eq. (A) would be modified to:

Eq. (A') If (APTS+M)−VPTS<−4500.

In general for FIG. 4A, the equations may be generally stated to be:

Eq. (I) |(APTS+M)−VPTS|<time drift threshold.

In the case of FIG. 4B, this equation is modified to be:

Eq. (II) |(VPTS+M)−APTS|<time drift threshold.

Depending upon the results of these computations, the audio playback and the video display of images may be resynchronized by repeating or skipping video frames or fractions thereof or by skipping or delaying audio data packets or fractions thereof. However, a human may easily perceive skipped or repeated audio data.

In controlling the synchronization of audio and video, it appears that the time drift threshold of plus and minus one half frame may cause an A/V synch circuit to oscillate and continuously repeat or skip frames or fractions thereof. Thus, a time drift resolution of one frame may be preferable as the finest frame time resolution. The time drift resolution used in the above computations above is not the same as skipping or repeating frames or fractions thereof (such as one half frame) during video image display and audio playback.

Referring again to FIG. 4B, when a VPTS is detected within the encoded/compressed data stream, the STC counter 411 is set and loaded with a binary value representing the detected VPTS at counter input 403. Depending upon how the STC counter 411 counts, the SCLK clock frequency is divided. Assume for the moment that the STC counter 411 counts by one, such that the SCLK frequency of 90 khz on line 401 is divided by one in frequency divider 410 generating the same frequency for the counter clock input 404. As the STC counter 411 is incremented the value for N is being generated. Upon reaching an APTS, the generation of N for the detected APTS is completed and the counter output 405 reflects the computation of (VPTS+N). When an APTS is detected within the encoded/compressed data stream, the register 412 is loaded with the binary value representing the detected APTS at register input 402. The subtracter 413 computes (VPTS+N)−APTS from the value of (VPTS+N) at subtracter input 405 and the value of APTS at subtracter input 406. The results output from subtracter 413 on bus 407 are compared with the time drift threshold provided on bus 409 by comparator 414 at appropriate times by the comparator enable input signal 420. As discussed above, the coarse time drift thresholds are compared first such that the following sequence of equations is performed by the comparator 414 for a display rate of 30 fps:

Eq. (K) If (VPTS+N)−APTS<−9000 then video lags audio by at least 3 frames so skip video frames and if not then Eq. (L) If (VPTS+N)−APTS>9000 then video leads audio by at least 3 frames so repeat video frames and if not then perform the next finer resolution steps Eq. (M) If (VPTS+N)−APTS<−7500 then video lags audio by at least 2.5 frames but not more than 3 so skip video frames and if not then Eq. (N) If (VPTS+N)−APTS>7500 then video leads audio by at least 2.5 frames but not more than 3 so repeat video frames and if not then perform the next finer resolution steps Eq. (O) If (VPTS+N)−APTS<−3000 then video lags audio by at least one frame but not more than 2.5 so skip video frames and if not then Eq. (P) If (VPTS+N)−APTS>3000 then video leads audio by at least one frame but not more than 2.5 so repeat video frames and if not then perform the next finer resolution steps Eq. (Q) If (VPTS+N)−APTS<−1500 then video lags audio by at least one half frame but not more than one frame so skip video frames and if not then Eq. (R) If (VPTS+N)−APTS>1500 then video leads audio by at least one half frame but not more than one frame so repeat video frames and if not then perform the next finer resolution steps else stop if there are no more finer resolution steps and the actual time drift is less than the last tested frame time of plus or minus one half frame.

Referring now to FIGS. 4A and 4B, as discussed above, depending upon how the STC counter 411 counts, the SCLK clock frequency is divided. If the STC counter 411 counts by 2, then the SCLK frequency of 90 khz on line 401 is divided by two in frequency divider 410 generating one half the frequency of SCLK for the counter clock input 404. If the STC counter 411 were to count by 128, then the SCLK frequency of 90 khz on line 401 is divided by 128 or $2^m$ where m=7 in frequency divider 410 generating 1/128 the frequency of SCLK for the counter clock input 404.

HARDWARE DESCRIPTION OF THE SYNCHRONIZATION CIRCUIT

In order to convert the functionality of the present invention into actual hardware, there are a number of desirable changes which may be made to the A/V sync circuit of FIGS. 4A and 4B in order for the A/V sync circuit to function in a single monolithic integrated circuit. Because there is a system latency associated with the time required to decompress and decode the encoded/compressed data into decoded and decompressed video and audio data, the time to display the image on a screen, and the time to playback the audio data, the differences in system latency for audio and video must be taken into account. Thus the VPTS or APTS needs to be corrected for the system latency by adding or subtracting a frame time value from the VPTS or APTS. This may be stated as:

Eq. (III) VPTS'=VPTS+AVLATENCY where AVLATENCY=VLATENCY−ALATENCY.

Alternately the APTS may be corrected to be

Eq. (IV) APTS'=APTS+VALATENCY where VALATENCY=ALATENCY−VLATENCY.

Thus various values of AVLATENCY and VALATENCY for different systems may be loaded into a register and added to either APTS or VPTS to acquire the corrected APTS or APTS' or the corrected VPTS or VPTS'. AVLATENCY and VALATENCY may be jointly referred to as AVLATENCY or simply system latency. Rearranging and reformulating equations (A) through (H) above we see for a display rate of 30 fps:

Eq. (1a) If (APTS+M)−(VPTS'−9000)<0 then video leads audio by at least 3 frames so repeat video frames and if not then Eq. (2a) If (VPTS'+9000)−(APTS+M)<0 then video lags audio by at least 3 frames so skip video frames and if not then perform the next finer resolution steps Eq. (3a) If (APTS+M)−(VPTS'−7500)<0 then video leads audio by at least 2.5 frames but not more than 3 so repeat video frames and if not then Eq. (4a) If (VPTS'+7500)−(APTS+M)<0 then video lags audio by at least 2.5 frames but not more than 3 so skip video frames and if not then perform the next finer resolution steps Eq. (5a) If (APTS+M)−(VPTS'−3000)<0 then video leads audio by at least one frame but not more than 2.5 so repeat video frames and if not then Eq. (6a) If (VPTS'+3000)−(APTS+M)<0 then video lags audio by at least one frame but not more than 2.5 so skip video frames and if not then perform the next finer resolution steps Eq. (7a) If (APTS+M)−(VPTS'−1500)<0 then video leads audio by at least one half frame but not more than one frame so repeat video frames and if not then Eq. (8a) If (VPTS'+1500)−(APTS+M)<0 then video lags audio by at least one half frame but not more than one frame so skip video frames and if not then perform the next finer resolution steps else stop if there are no more finer resolution steps and the actual time drift is less than the last tested frame time of plus or minus one half frame.

For a display rate of 60 fps not only are the time threshold values cut in half but so is the latency represented by the value AVLATENCY. Thus, APTS may be corrected to APTS" and VPTS may be corrected to VPTS". Equations Eq. (1a)−(6a) may be modified to Eq. (1b)−(8b):

Eq. (1b) (APTS+M)−(VPTS"−4500)<0

Eq. (2b) (VPTS"+4500)−(APTS+M)<0

Eq. (3b) (APTS+M)−(VPTS"−3750)<0

Eq. (4b) (VPTS"+3750)−(APTS+M)<0

Eq. (5b) (APTS+M)−(VPTS"−1500)<0

Eq. (6b) (VPTS"+1500)−(APTS+M)<0

Eq. (7b) (APTS+M)−(VPTS"−750)<0

Eq. (8b) (VPTS"+750)−(APTS+M)<0

Note that as the display rate changes, the time drift thresholds and the VPTS' and APTS' are modified in equations Eq. (1b)−(8b). In order to reduce circuit size, the time drift thresholds may be rounded to binary values from the ideal decimal values to a value referred to herein as an offset value.

Because the time stamp values are 33 bits wide, the counter and subtracter may have to be 33 bits wide as well. This may be undesirable in an integrated circuit as it would increase circuit size and the usage of silicon real estate. Instead, it may be desirable to truncate the 33 bit values to a width which is more manageable. Recall that the preferred system clock frequency recommended by the MPEG standard was 90 kilohertz or a period of 11.11 microseconds (us). Thus using the system of FIG. 4A described above where the frequency divider divides by one ($2^m=1$ where m=0), each count of the counter represents 11.11 us. Thus, the least significant bit of the APTS and VPTS time stamp values represents 11.11 us as well. The second LSB represents 22.22 us, the third LSB 44.44 us, the fourth LSB 88.88 us, and so on. Recall that for 30 fps one half frame time was 1500 SCLK clock cycles which is approximately 16.67 milliseconds, one frame time 3000 SCLK clock cycles or 33.33 ms, two and one half frame cycles 7500 SCLK clock cycles or 83.33 ms. FIG. 9 illustrates for the lower 18 bits of the 33 bit time stamps, certain patterns of time values of interest.

For the time drift thresholds of one half, one, two and one half, and three frame times the offset comparison values of plus and minus 1536, 3072, 7680, and 9216 are near approximations. Selecting these values allows truncation of the width of the offset comparison values to bits 9 through 13 because all the other upper and lower bits are zero. Thus, only 5 bit wide values and 5 bit wide storage registers for the offset comparison need be used in the design of the present invention. This modifies Eq. (1a)−(8a) to be respectively Eq. (9a)−(16a) as follows:

Eq. (9a) (APTS+M)−(VPTS'−9216)<0

Eq. (10a) (VPTS'+9216)−(APTS+M)<0

Eq. (11a) (APTS+M)−(VPTS'−7680)<0

Eq. (12a) (VPTS'+7680)−(APTS+M)<0

Eq. (13a) (APTS+M)−(VPTS'−3072)<0

Eq. (14a) (VPTS'+3072)−(APTS+M)<0

Eq. (15a) (APTS+M)−(VPTS'−1536)<0

Eq. (16a) (VPTS'+1536)−(APTS+M)<0

For a display rate of 60 fps where the corrected time drift values for one half, one, two and one half, and three frame times were respectively plus and minus 750, 1500, 3750, and 4500. From the table above the values of plus and minus 768, 1536, 3840, and 4608 may be substituted in order to truncate the number of required bits. Note that 768 may be extracted from 1536 by dividing by two which just shifts the value for 1536 one bit towards the LSB. Other values may be obtained in this manner as well in order to maintain the width of the offset value to 5 bits wide. Preferably a frequency divider will be used with Eq. (9a)−(16a) for a display rate a multiple or fraction of two from the display rate of 30 fps. The 60 fps equations modified from Eq. (1b)−(8b) are:

Eq. (9b) (APTS+M)−(VPTS"−4608)<0

Eq. (10b) (VPTS"+4608)−(APTS+M)<0

Eq. (11b) (APTS+M)−(VPTS"−3840)<0

Eq. (12b) (VPTS"+3840)−(APTS+M)<0

Eq. (13b) (APTS+M)−(VPTS"−1536)<0

Eq. (14b) (VPTS"+1536)−(APTS+M)<0

Eq. (15b) (APTS+M)−(VPTS"−768)<0

Eq. (16b) (VPTS"+768)−(APTS+M)<0

This technique may be applied to generate equations and values for 15 fps from the 30 fps equations by doubling the offset values which is accomplished by shifting an offset value for 30 fps one bit towards the MSB. Alternately instead of shifting the offset value the division of the system clock by a variable frequency divider may use equations (9a)−(16a) for the proper display rate. The resultant equations for 15 fps are as modified from Eq. (9a)−(16a) are as follows:

Eq. (9c) (APTS+M)−(VPTS'''−18452)<0

Eq. (10c) (VPTS'''+18452)−(APTS+M)<0

Eq. (11c) (APTS+M)−(VPTS'''−15360)<0

Eq. (12c) (VPTS'''+1536)−(APTS+M)<0

Eq. (13c) (APTS+M)−(VPTS'''−6144)<0

Eq. (14c) (VPTS'''+6144)−(APTS+M)<0

Eq. (15c) (APTS+M)−(VPTS'''−3072)<0

Eq. (16c) (VPTS'''+3072)−(APTS+M)<0

The VPTS is shown as being corrected to VPTS''' in Eq. (9c)−(16c) for the proper latency for a display rate of 15 fps. Alternately the value of APTS may be corrected to APTS'''. Note that the offset values for Eq (9c)−(16c) are double those of Eq. (9a)−(16a) and the offset values for Eq. (9b)−(16b) are one half those of Eq. (9a)−(16a). Thus, by using offset numbers selected for a display rate of 30 fps, other offset numbers may be generated for display rates which are a multiple or a fraction of two by shifting bits of the offset value left or right. If display rate is not a multiple or fraction of two of 30 fps, then other offset numbers need to be loaded into the A/V sync circuit. Alternatively, by varying the division of the frequency of SCLK other display rates may be supported by a single set of equations such as Eq. (9a)−(16a).

For the logic of FIG. 4A and Eq (A)−(H), where VPTS is subtracted from an incremented APTS value, Eq. (9a)−(16a), (9b)−(16b), and (9c)−(16c) are applicable. For the logic of FIG. 4B and Eq. (K)−(R), where APTS is subtracted from an incremented VPTS value, Eq. (9a)−(16a), (9b)−(16b), and (9c)−(16c) may be modified to respectfully become Eq. (17a)−(24a), (17b)−(24b), and (17c)−(24c).

For a display rate of 30 fps:

Eq. (17a) (VPTS+N)−(APTS'−9216)<0

Eq. (18a) (APTS'+9216)−(VPTS+N)<0

Eq. (19a) (VPTS+N)−(APTS'−7680)<0

Eq. (20a) (APTS'+7680)−(VPTS+N)<0

Eq. (21a) (VPTS+N)−(APTS'−3072)<0

Eq. (22a) (APTS'+3072)−(VPTS+N)<0

Eq. (23a) (VPTS+N)−(APTS'−1536)<0

Eq. (24a) (APTS'+1536)−(VPTS+N)<0

For a display rate of 60 fps:

Eq. (17b) (VPTS+N)−(APTS''−4608)<0

Eq. (18b) (APTS''+4608)−(VPTS+N)<0

Eq. (19b) (VPTS+N)−(APTS''−3840)<0

Eq. (20b) (APTS''+3840)−(VPTS+N)<0

Eq. (21b) (VPTS+N)−(APTS''−1536)<0

Eq. (22b) (APTS''+1536)−(VPTS+N)<0

Eq. (23b) (VPTS+N)−(APTS''−768)<0

Eq. (24b) (APTS''+768)−(VPTS+N)<0

For a display rate of 15 fps:

Eq. (17c) (VPTS+N)−(APTS'''−18452)<0

Eq. (18c) (APTS'''+18452)−(VPTS+N)<0

Eq. (19c) (VPTS+N)−(APTS'''−15360)<0

Eq. (20c) (APTS'''+15360)−(VPTS+N)<0

Eq. (21c) (VPTS+N)−(APTS'''−6144)<0

Eq. (22c) (APTS'''+6144)−(VPTS+N)<0

Eq. (23c) (VPTS+N)−(APTS'''−3072)<0

Eq. (24c) (APTS'''+3072)−(VPTS+N)<0

Figure 5A:
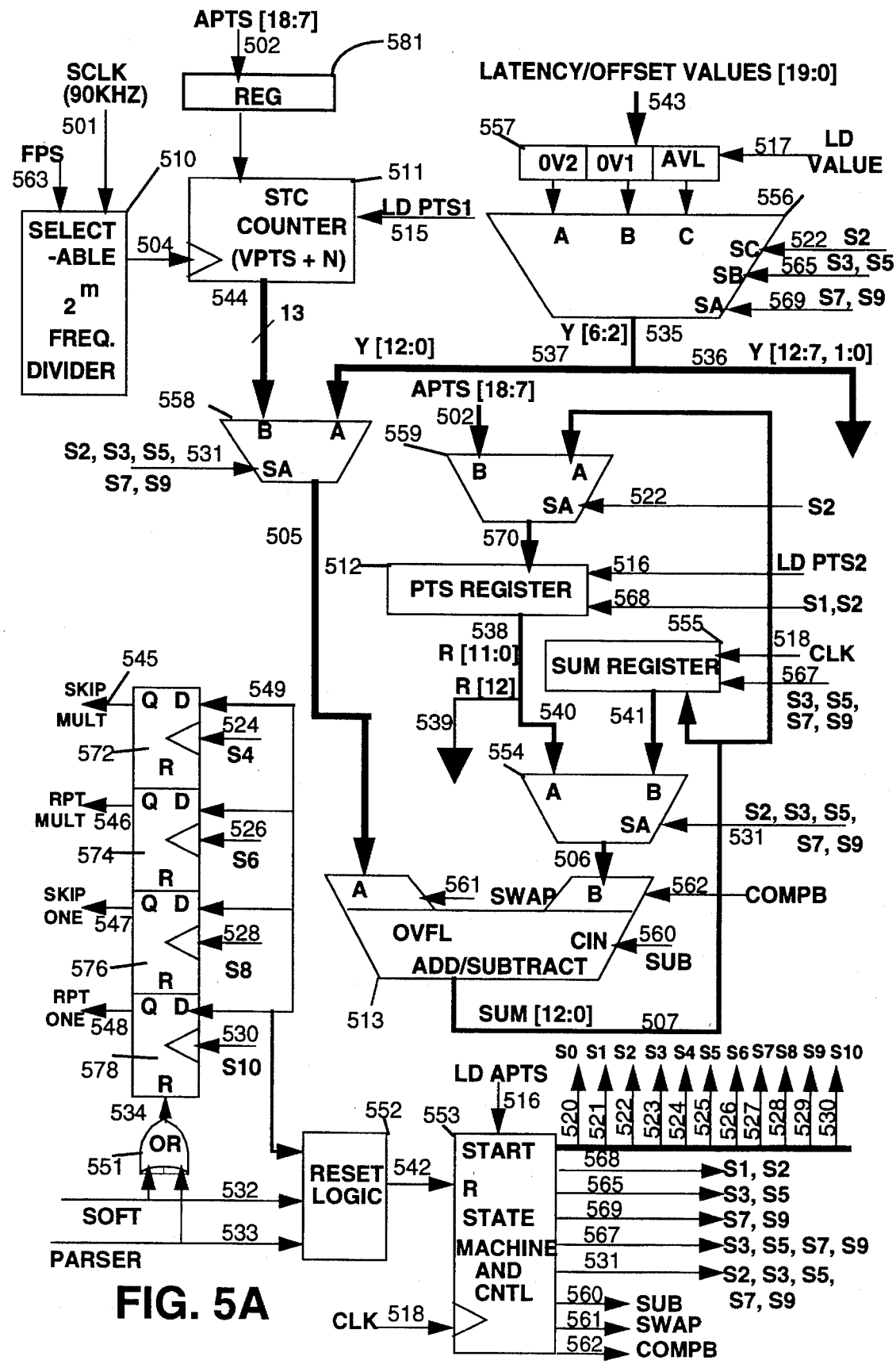
FIG. 5A illustrates a detailed block diagram of the logical circuitry of the preferred embodiment of the present invention.
Figure 5B:
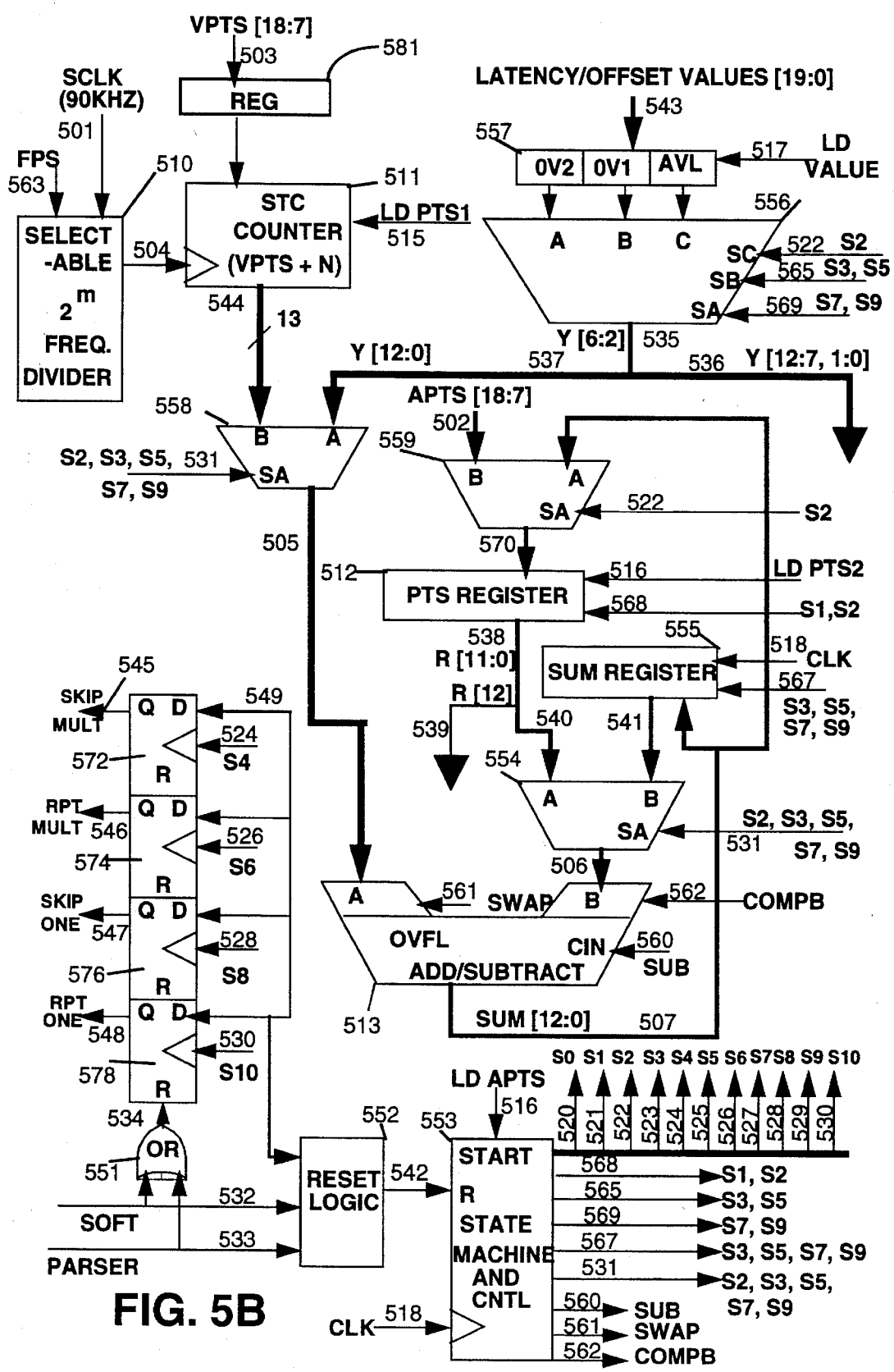
FIG. 5B illustrates a detailed block diagram of the logical circuitry of a second embodiment of the present invention.

FIG. 5A illustrates an A/V Sync Circuit, similar in functionality to that of FIG. 4A, which may use four of the eight equations, Eq. (9a)−(16a). FIG. 5B illustrates an A/V Sync Circuit, similar in functionality to that of FIG. 4B, which may use four of the eight equations, Eq. (17a)−(24a). The operation of the circuit of FIG. 5B is similar to the operation of the circuit of FIG. 5A. Accordingly much of the discussion which follows is applicable to both circuits. Two offset values and an AVLATENCY value are loaded into register 577 at input 543 upon receiving the load value signal at input 517. Truncating or rounding the time drift thresholds to obtain the offset values may reduce the data bus width for the remaining hardware in FIG. 5A when combined with the frequency divider 510. Shifting left or right to obtain a multiple or fraction of two of the stored offset value may be accomplished by the multiplexer 566. Preferably the frequency divider 510 is used to obtain multiples of the offset value for the 30 fps equations as well as to support truncation which was briefly discussed with regards to the frequency divider 410 of FIG. 4A. FIG. 9 and FIG. 5A illustrate the advantage of using the frequency divider in combination with the truncated corrected time drift thresholds referred to as offset values. Although the APTS and VPTS were described as being 33 bit values, however, in order to determine the desired maximum time drift range, not all most significant bits of the APTS and VPTS are required. For example, the 2nd MSB represents $2^{31} \times 11.11$ us which is 6.625 hours while the 1st MSB indicates AM or PM. Thus, it is not expected that the audio playback would be so far out of synchronization with the video playback. It is expected that the audio and video may be out of synchronization in the range from 0 to three seconds which may be represented by bits 18 to 0.

Thus, bits 32 to 19 of both the APTS and VPTS values may be truncated. Also because resynchronization is not expected for a time value less than 1.42 ms, which is less than one tenth of a 60 fps frame, bits 6 to 0 of the APTS and VPTS values may be truncated as well. Thus, the desired range of bits to be analyzed for the APTS and VPTS values is 18 to 7.

In FIG. 5A you can see that the truncated APTS [18:7] is input into the counter 511 on bus 502 and the truncated VPTS [18:7] is input into the register 512 on bus 503. Because of the truncation, the counter 511 must accordingly count to match the truncation as well as the appropriate display rate and given offset values. Considering only truncation, the counter should count by counts of $2^7$ (128). Thus, the selectable frequency divider 510 would divide SCLK frequency by 128 to provide the proper incrementation input to counter 511 at line 504. Thus, truncation of the widths of VPTS, APTS, and the corrected time drift thresholds will allow the use of smaller counters, adders, registers, busses and other hardware in order to provide an A/V Sync circuit having less circuitry.

To further reduce the amount circuitry consumed by the A/V sync circuit, a single adder/subtracter is used in FIG. 5A to perform the operations of Eq. (9a)−(16a), Eq. (9b)−(16b), Eq. (9c)−(16c) or other similar equations for determining if the time drift has exceeded a threshold. If the result of the computation of one of the equations by the adder/subtracter in FIG. 5A results in an overflow condition, indicating a negative value, then the equation has been satisfied. Because APTS, VPTS, and the corrected time drift values were truncated, the adder/subtracter 513 only requires 12-bits. Of course, it can be appreciated that no truncation or other bits may be truncated to arrive at different data widths for APTS, VPTS, and the corrected time drift values, thereby requiring a different size adder/subtracter as well different sizes for other circuitry.

Now the operation of the A/V sync circuit of FIG. 5A will be described in detail assuming a display rate of 30 fps, time drift thresholds of plus and minus one and three frame times, with Eq. (9a)−(10a), (13a)−(14a) being applicable. The system is initially reset upon receiving either a software reset or a reset from the parser within the system decoder. The system may also be reset when one of the resultant Eq. (9a)−(10a), (13a)−(14a) is satisfied. In the case that the audio and video are out of synchronization by more frames than may be timely accommodated, an interrupt request is sent to software such that the software may perform the resynchronization. In the case where audio and video are out of synchronization and it is desirable to skip a video frame, however a B-type frame has not been found within the compressed video data stream for a predetermined period of time, then an interrupt may be sent to the software as well in order that the software may cause a skip of a video frame or frames to synchronize the audio and video. In any case upon a reset condition, the reset logic 552 resets the state machine 553 to the IDLE state zero (S0) 520. The selectable frequency divider 510 divides the system clock to accommodate the truncation and a different frame rate. If register 557 is loaded with the values for a 30 fps display rate as depicted in Eq. (9a)–(10a), (13a)–(14a) and the actual received compressed bit stream matches the display rate of 30 fps, then the frequency divider divides by $2^7$ (128) to match the truncation only. However, if the values in register 557 remain being loaded with the values for Eq. (9a)–(10a), (13a)–(14a) and the actual received compressed bit stream is of 60 fps, then the selectable frequency divider 510 divides by 2(64) in order to allow the counter 511 to count faster. Changing the division of the selectable frequency divider 510 from $2^7$ (128) to $2^6$ (64), has the equivalent effect of dividing the offset values stored in register 557 in half such that Eq. (9b)–(10b), (13b)–(14b) may be effectively used by the circuit of FIG. 5A. Similarly, if the compressed bit stream is of a display rate of 15 fps then the divider divides by 256 or $2^8$ in order to create the effect of multiplying the offset values stored in register 557 by two such that Eq. (9c)–(10c), (13c)–(14c) may be used.

The system during state zero (S0) 520 reads the appropriate offset values and latency value into register 557. Assume that time drift is check to see if it exceeds the preferable time drift thresholds of plus and minus one frame time and plus and minus three frame times. The order of sequence of the equations will be slightly modified because it may be preferable to know first if encoded/compressed video frames may be skipped and then to know if decoded/decompressed video frame may be repeated. Thus, the order of computation of the equations is as follows:

Eq. (10a) (VPTS'+9216)–(APTS+M)<0

Eq. (9a) (APTS+M)–(VPTS'–9216)<0

Eq. (14a) (VPTS'+3072)–(APTS+M)<0

Eq. (13a) (APTS+M)–(VPTS'–3072)<0 for a nominal display rate of 30 fps wherein VPTS is modified by the AVLATENCY value to become VPTS'.

The offset values, which are truncated values, are loaded into register 577 in parallel with the AVLATENCY value from bits [19:0] of bus 543. For example, the offset value 9216 represented by the binary pattern 10010 from bits [13:9] of FIG. 9 may be loaded into the five bits [9:5] of register 557 marked OV1. The offset value 3072 represented by the binary pattern 001100 from bits [13:9] of FIG. 9 may be simultaneously loaded into the five bits [14:10] of register 557 marked OV2. The AVLATENCY value may be simultaneously loaded into the 5 bits [4:0] of register 557 marked AVL. The A/V sync circuit may wait in state 0 (520) to receive a first APTS value from the compressed data stream. Upon the occurrence of the APTS, such as APTS 312 in FIG. 3A, the A/V sync circuit of FIG. 5A may initialize the counter 511 to the truncated APTS value which is available on bus 502. SCLK executes $2^m$ clock cycles before the selectable frequency divider 510 allows counter 511 to increment from the initialized APTS value. In this case after 128 SCLK clock cycles are counted, the frequency divider 510 increments the counter 511. The counter 511 continually increments and is reinitialized by the LD PTS1 signal 515 to a new APTS value after receipt of the new APTS value within the compressed data stream has been stored by register 581. After the counter 511 has been incremented a number of times, a VPTS is received in the compressed data stream, such as VPTS 308 in FIG. 3A, which causes the state machine 553 to jump to state 1 (S1) 521.

During state 1 a truncated VPTS value is selected by multiplexer 559 to be loaded into the PTS register 512. The next step is to correct VPTS to VPTS' by the Eq. (III) which is repeated below:

Eq. (III) VPTS'=VPTS+AVLATENCY.

A chip clock 518 increments the state machine 553 to the next state, state 2 (S2) 522, in order to perform Eq. (III). During S2 the AVLATENCY value stored in bits [4:0] of register 517 is selected to pass through multiplexer 556 onto bits 6 to 2, Y[6:2] 535, of bus Y[12:0] 537. The remaining bits numbered 12 to 7 and 1 to 0, Y[12:7,1:0] 536, of bus Y[12:0] 537 are connected to ground in order to set bits 12 to 7 and 1 to 0 to a logical zero level.

During states 2, 3, 5, 7 and 9, signal 531 (S2,S3,S5,S7,S9) selects the bus Y[12:0] 537 to pass through multiplexer 558 onto bus 505 as input A of the adder/subtracter 513. Signal 531 (S2,S3,S5,S7,S9) also selects bus R[12:0] 540 to pass through multiplexer 554 and into input B of adder/subtracter 513 during states 2, 3, 5, 7 and 9. Register 512 drives the truncated value of VPTS, VPTS[18:7] which is stored therein, onto bits 11 to 0, R[11:0] 538, of bus R[12:0] 540. During state 2 the truncated value of VPTS passes through multiplexer 554 and into input B on bus 506 of adder/subtracter 513. Adder/subtracter is an adder having the capability of performing subtraction using two's complement addition and the capability of swapping input A for input B and vice-versa. During state 2 the adder/subtracter 513 performs (AVLATENCY+VPTS) and drives bus SUM [12:0] 507 with the VPTS' value. The output, SUM[12:0] of adder/subtracter 513, is stored in register 512 during state 2 and in register 555 during states 3, 5, 7, and 9. Thus, during state 2 the result of (AVLATENCY+VPTS)=VPTS' is stored in register 512. Next the state machine 553 jumps to state 3 (S3) 523.

During state 3 (S3) 523 the first step in computing Eq. (10a) (VPTS'+9216)–(APTS+M)<0 is performed to determine if the video lags the audio by more than 3 frame times. The value of (VPTS'+9216) is generated while the counter holds the value of (APTS+M). During states 3 and 5, signal 565 (S3,S5) selects the offset value OV1 to pass through multiplexer 556 and onto bits 2 to 6 of Y[12:0] bus 537. Signal 531 selects Y[12:0] bus 537 to pass through multiplexer 558 onto bus 505 and into input A of adder/subtracter 513. The value of VPTS', stored in register 512, is selected by signal 531 to pass through multiplexer 554 onto bus 506 and into input B of adder/subtracter. Adder/subtracter control signals 560–562 cause the adder/subtracter to perform the function of A+B. Thus adder/subtracter 513 performs (9216+VPTS') and outputs the result on SUM[12:0] bus 507. The results on SUM[12:0] bus 507 are stored in register 555 during states 3, 5, 7, and 9 by chip clock 518 and signal 567 (S3,S5,S7,S9). Chip clock signal also causes the state machine to jump to the next state, state 4.

During state 4 (S4) 524, the final step of computing (VPTS'+9216)–(APTS+M)<0 of Eq. (10a) is performed. During states 4, 6, 8, and 10 signal 531 selects the output of counter 511 to pass through multiplexer 558 onto bus 505 which is input into input A of adder/subtracter 513. The output of counter 511 appears to be constant during the computations of the equations because the counter is incremented by the output from the selectable frequency divider 510 while the rest of the A/V sync circuitry in FIG. 5A is operating at the frequency of the system clock. Thus the counter output 544 should not have incremented from its value after the VPTS was received.

During states 4, 6, 8, and 10, signal 531 selects the output from register 555 to pass through multiplexer 554 onto bus 506 and into input B of adder/subtracter 513. During state 4 the value (9216+VPTS') is input into adder/subtracter 513 as input B and the value (APTS+M) is input into adder/subtracter 513 as input A. The adder/subtracter control signals 560–562 selects adder/subtracter 513 to perform the operation B–A. SWAP signal 561 is active to swap A and B inputs and COMPB signal 562 is active such that the adder/subtracter 513 complements and converts (APTS+M) into its twos complement form with the addition of SUB signal 560 at the carry input of adder/subtracter 513. The adder/subtracter 513 thereafter adds (VPTS'+9216) to −(APTS+M).

If the overflow output 549 of adder/subtracter 513 indicates an overflow condition during state 4 then Eq. (10a) has been satisfied and the display of video images lags the audio playback by at least 3 frames such that video frames or fractions thereof may be skipped to catch up to the latter audio playback time. If the computation does not result in an overflow condition, the state machine jumps to state 5 (S5) 525. Overflow output 549 is stored into D flip flop 572 during state 4, D flip flop 574 during state 6, D flip flop 576 during state 8, and D flip flop 578 during state 10. In the case of an overflow condition, control signal output SKIP MULT 545 will signal other circuitry (not shown) to cause multiple skips of frames of video images, such as three frames in order to have the video images substantially match the audio playback. Alternately the control signal output 545 may cause the audio playback to be delayed by a number of frames while the video display of images catch up. However, this latter technique is not preferable as changes in the audio playback are more noticeable to the human ear than changes in video images are to the human eye. Further, if the overflow condition exists, the overflow output 549 causes the state machine 553 to reset through the reset logic 552. Once one of the Eq. (9a), (10a), (13a), or (14a) has been satisfied, the A/V sync circuit of FIG. 5A need not perform the entire sequence of computations. Recall that if the computation of (VPTS'+9216)−(APTS+M) does not result in an overflow condition then the state machine 553 jumps to state 5.

During state 5 (S5) 523, computation of Eq. (9a) (APTS+M)−(VPTS'−9216)<0 is begun to determine if the video leads the audio by more than 3 frame times. State 5 generates (VPTS'−9216). Control signal 565 (S3,S5) during state 5 selects an offset value stored in OV1 to pass through multiplexer 556 and onto bits 6 to 2 of bus Y[12:0] 537. Control signal 531 during state 5 selects bus Y[12:0] 537 to pass through multiplexer 558 and into input A of adder/subtracter 513. Control signal 531 during state 5 further selects bus R[12:0], having the truncated VPTS on bits 11 to 0, to pass through multiplexer 554 and into input B of adder/subtracter 513. The adder/subtracter control signals 560–562 selects adder/subtracter 513 to perform the operation B–A. SWAP signal 561 is active to swap A and B inputs and COMPB signal 562 is active such that the adder/subtracter 513 complements and converts (9216) into its twos complement form with the addition of SUB signal 560 at the carry input of adder/subtracter 513. Thus, adder/subtracter 513 performs the addition of (VPTS+−9216) for which the result on bus 507 is stored into register 555 during state 5. The state machine then jumps to state 6.

During state 6 (S6) 526 the computation of Eq. (9a) (APTS+M)−(VPTS'−9216)<0 is completed. The value of (VPTS+−9216) is subtracted from (APTS+M). Signal line 531 during state 6 selects the counter output bus 544 to pass through multiplexer 558 onto bus 505 which is input into input A of adder/subtracter 513. Signal line 531 also selects the output from register 555 on bus 541 to pass through multiplexer 554 and onto bus 506 and into input B of adder/subtracter 513. The adder/subtracter control signals 560–562 selects adder/subtracter 513 to perform the operation B–A. SWAP signal 561 is active to swap A and B inputs and COMPB signal 562 is active such that the adder/subtracter 513 complements and converts (VPTS'+−9216) into its twos complement form with the addition of SUB signal 560 at the carry input of adder/subtracter 513. Adder/subtracter 513 performs the addition of −(VPTS'+−9216) to (APTS+N). If an overflow condition results by the addition of −(VPTS'+−9216) to (APTS+N), then Eq. (9a) has been satisfied and the video leads the audio by at least 3 frames. If no overflow condition exists, the state machine may jump to state 7.

In the case of an overflow condition, the overflow output 549 is stored in D flip flop 574 during state 6. Control signal output RPT MULT 546 is generated signaling other circuitry (not shown) to repeat multiple frames of video images, such as three frames, in order that the video image is held constant and the audio may catch up to the video. Alternately, control signal output 545 may cause the audio playback to skip a number of frames or data packets to catch the video display of images, however skipping audio data is not preferable. Furthermore, in the case of an overflow condition, the state machine 553 is reset to state 0. Recall that if the computation of (APTS+M)−(VPTS'−9216) does not result in an overflow condition then the state machine jumps to state 7.

During state 7, (S7) 525, the computation of Eq. (14a) (VPTS'+3072)−(APTS+M)<0 is begun to determine if video lags audio by more than the one frame time. During state 7 the value for (VPTS'+3072) is generated. During state 7 and 9 the offset value OV2 from register 557 is selected by signal 569 (S7,S9) to pass through multiplexer 556 onto bits 6 to 2 of bus Y[12:0] 537. Signal 531 selects the bus Y[12:0] 537 to pass through multiplexer 558 onto bus 505 and into input A of adder/subtracter 513. Signal line 531 during state 7 also selects bus R[12:0] 540, having the VPTS value stored in register 512 available on bits 11 to 0, to couple to bus 506 as input B of adder/subtracter 513. The adder/subtracter control signals 560–562 selects adder/subtracter 513 to perform the operation A+B. SWAP signal 561, COMPB signal 562, and SUB signal 560 are inactive so that adder/subtracter 513 may perform the addition of (VPTS'+3072). The resultant output on bus 507 is stored in register 555 during state 7 by signal 567 and chip clock 518. Chip clock 518 also causes the state machine to jump to state 8.

During state 8 (S8) 528 the computation of Eq. (14a) (VPTS'+3072)−(APTS+M) is completed. The value of (APTS+M) within counter 511 is subtracted from the value of (VPTS'+3072) stored in register 555. During state 8, signal 531 selects the counter output on bus 544 to pass through multiplexer 558 onto bus 505 and into input A of adder/subtracter 513. Signal 531 during state 8 also selects output from register 555 on bus 541 to pass through multiplexer 554 onto bus 506 as input B of adder/subtracter 513. Adder/subtracter control signals 560–562 select adder/subtracter 513 to perform the operation B–A. SWAP signal 561 is active to swap A and B inputs and COMPB signal 562 is active such that the adder/subtracter 513 complements and converts (APTS+M) into its twos complement form with the addition of SUB signal 560 at the carry input of adder/subtracter 513. Adder/subtracter then adds (VPTS'+3072) to −(APTS+M).

If an overflow condition results from the addition of (VPTS'+3072) to −(APTS+M), then Eq. (14a) has been satisfied and the video lags the audio by at least one frame but not more than 3 frees. If no overflow condition exists the state machine jumps to state 9.

In the case of an overflow condition, the overflow output 549 is stored in D flip flop 576 during state 8 generating control signal output 547 which signals other circuitry (not shown) to skip one frame or a fraction thereof of a video image. Alternately, the control signal output 547 may cause the audio playback to be delayed by one frame of audio data or fraction thereof to allow the video display of images to catch up; however, this is not preferable. In the case of an overflow, the state machine may be reset to state 0 because further computations are unnecessary. However, if no overflow condition occurred after making the Eq. (14a) computation, the state machine 553 jumps to state 9.

During state 9, (S9 529), the computation of Eq. (13a) (APTS+M)−(VPTS'−3072)<0 is begun in order to determine if the video leads the audio by more than one frame time. During state 9 the truncated offset value OV2 is selected from register 557 by signal 569 to pass through multiplexer 556 onto bits 6 to 2 of bus Y[12:0] 537. Signal 531 selects the bus Y[12:0] 537 to pass through multiplexer 558 onto bus 505 and is input into input A of adder/subtracter 513. Signal 531 during state 9 also selects bus R[12:0] 540, having the VPTS value stored within register 512 available on bits 11 to 0, to pass through multiplexer 554 and onto bus 506 as input B of adder/subtracter 513. The adder/subtracter control signals 560–562 selects adder/subtracter 513 to perform the operation B−A. SWAP signal 561 is active to swap A and B inputs and COMPB signal 562 is active such that the adder/subtracter 513 complements and converts (3072) into its twos complement form with the addition of SUB signal 560 at the carry input of adder/subtracter 513. Thus, adder/subtracter 513 performs the addition of (VPTS+−3072) for which the result on bus 507 is stored into register 555 during state 9 by chip clock 518 and signal 567. Chip clock 518 also causes the state machine 553 to jump to state 10.

During state 10 the computation of Eq. (13a) (APTS+M)−(VPTS'−3072) is completed. The value of (VPTS'−3072) which is presently stored in register 55 is subtracted from (APTS+M). During state 10 signal 531 selects the output of counter 511 on bus 544 to pass through multiplexer 558 onto bus 505 and into input A of adder/subtracter 513. Signal line 531 during state 10 selects the register output on bus 541 to pass through multiplexer 554 onto bus 506 as input B of adder/subtracter 513. Adder/subtracter control signals 560–562 select adder/subtracter 513 to perform the operation B−A. SWAP signal 561 is active to swap A and B inputs and COMPB signal 562 is active such that the adder/subtracter 513 complements and converts (VPTS'+−3072) into its twos complement form with the addition of SUB signal 560 at the carry input of adder/subtracter 513. Adder/subtracter 513 performs the addition of −(VPTS'+−3072) to (APTS+N).

If an overflow condition results from the addition of −(VPTS'+−3072) to (APTS+N), then Eq. (13a) has been satisfied and the audio leads video by at least one frame but not more than three frames. If no overflow condition exists, the state machine jumps to the idle state, state 0.

In the case of an overflow condition, the overflow output 549 is stored in D flip flop 578 during state 10 generating control signal output 548 which signals other circuitry (not shown) to repeat one frame or a fraction thereof of a video image to allow the audio to catch up. Alternately, the control signal output 548 may cause the audio playback to skip one frame or fraction thereof of audio data to match the video display of images; however, this is not preferable. The state machine is reset to state 0 by the overflow condition because further computation may be unnecessary. If no overflow condition occurs after making the Eq. (13a) computation, then the state machine rolls over to state 0 because the actual time drift is less than that tested by Eq. (12a), (11a), (14a), and (13a).

While the A/V sync circuit of FIG. 5A has been described in the foregoing example in particular detail using only 4 equations and 2 offset values, additional equations and offset values may be accommodated by adding additional registers and providing additional states to the state machine or the computations of other equations may be performed or the present equations may be performed in other ways. Other modifications will be obvious to one skilled in the art. One modification which is of interest is that of FIG. 5B. FIG. 5B illustrates a second A/V sync circuit which determines an out of sync condition in a slightly different way than the circuit of FIG. 5A. Note that the truncated value of VPTS is input to counter 511 and the truncated value of APTS is input into register 512. In the discussion of FIG. 5A Eq. (12a), (11a), (14a), and (13a) were used. For FIG. 5B, Eq. (20a)−(19a) and (22a)−(21a) may be used for one and three frame times. The A/V Sync circuit of FIG. 5B operates in a similar manner as the A/V Sync circuit of FIG. 5A. For each occurrence of VPTS in the encoded video stream such as 306–308 in FIG. 3A, counter 510 is reloaded with a binary value representing the VPTS value. Counter 510 is incremented by SCLK. Upon the occurrence of APTS within the encoded data stream such as 312 in FIG. 3A, the binary value representing APTS is stored into register 512 so that the correction for latency and the computations of the equations may occur. Otherwise, the circuit of FIG. 5B functions and operates similar to FIG. 5A as discussed above.

MEMORY CONTROL TO SKIP, REPEAT, OR DELAY DATA

Figure 6:
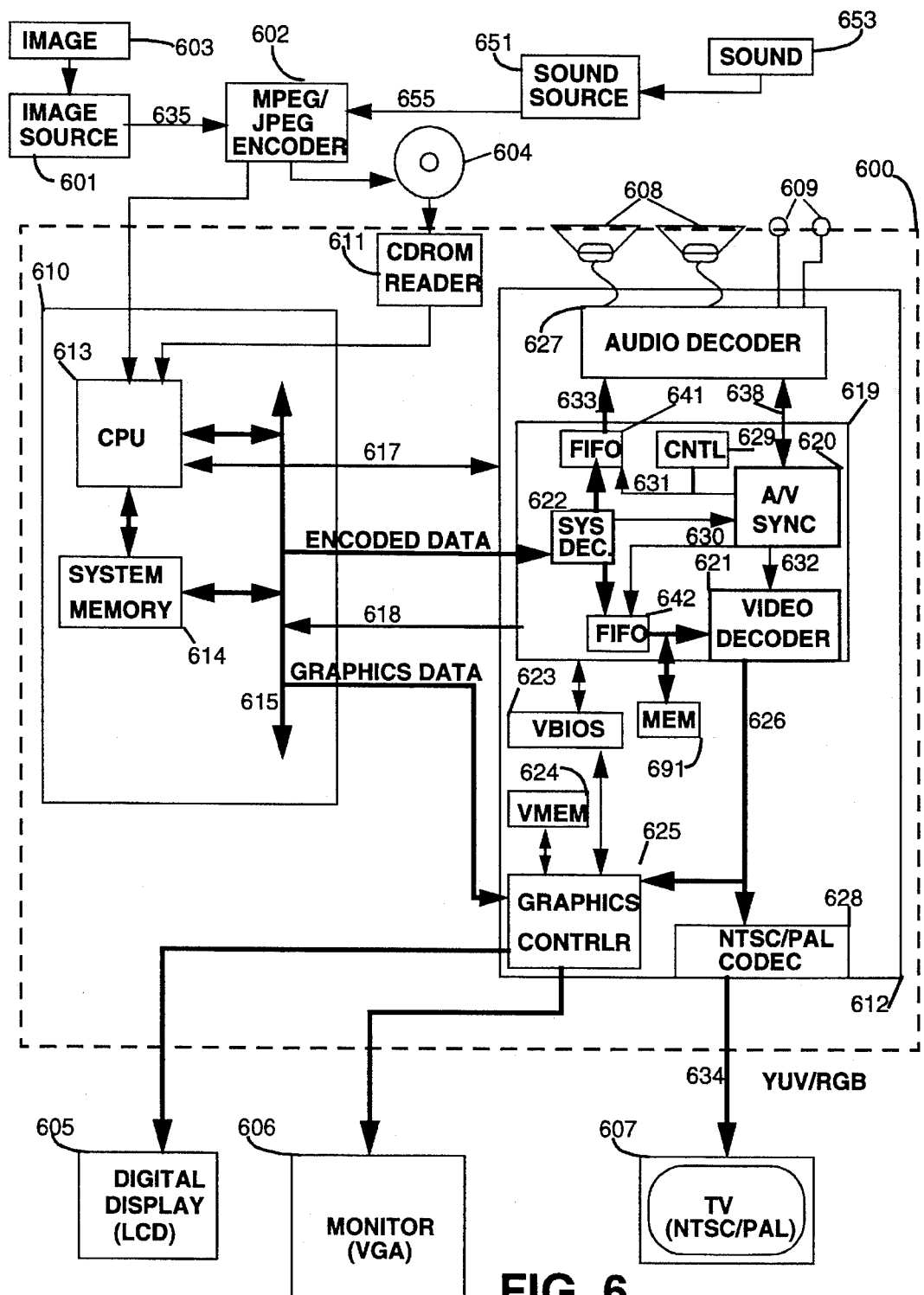
FIG. 6 illustrates a simplified system diagram of how the present invention is used within a multimedia computer system.
Figure 8:
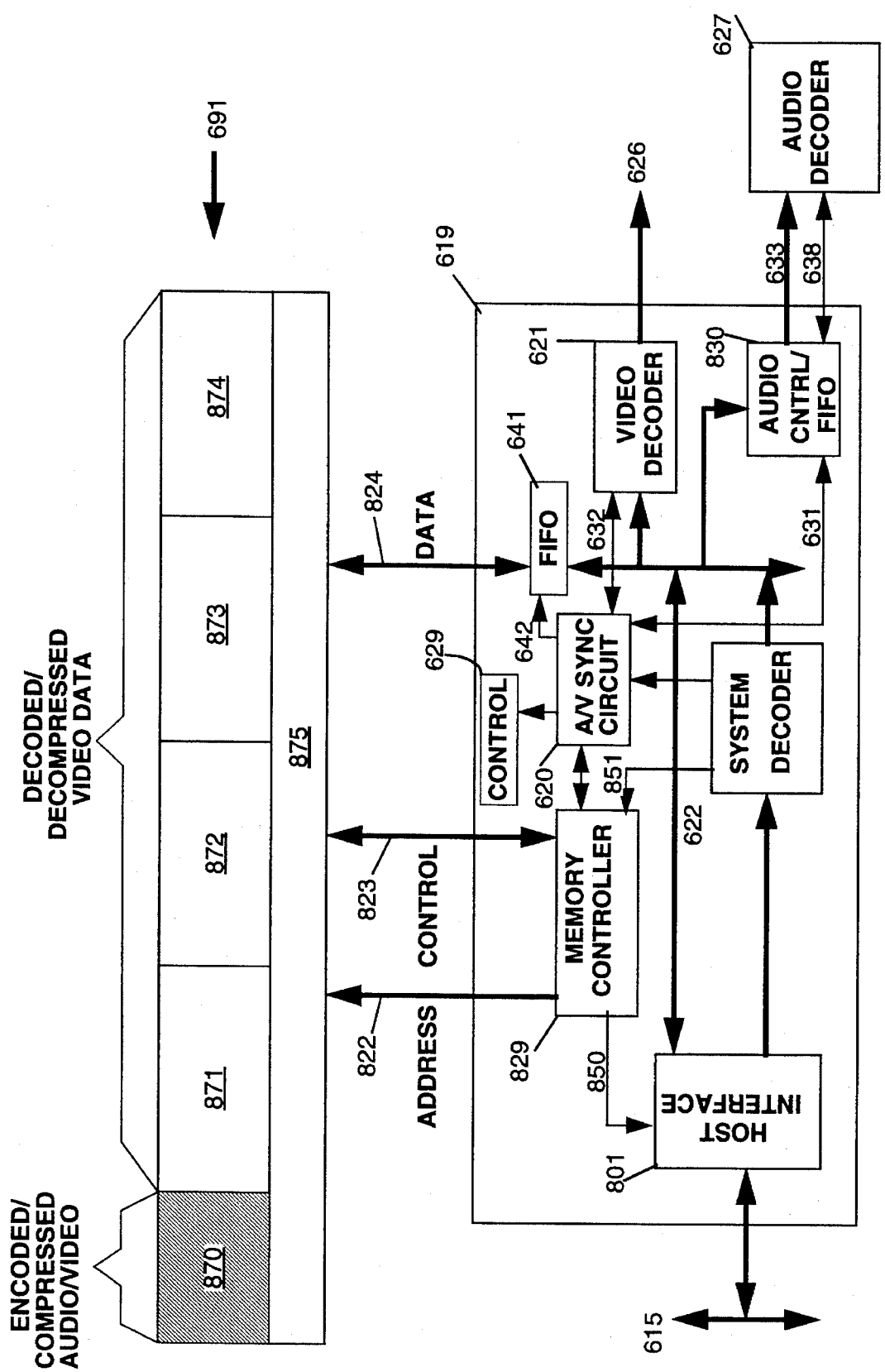
FIG. 8 is a block diagram illustrating the functionality and control of a frame buffer memory for storing encoded/compressed audio and video data and decoded/decompressed video data by the present invention.

FIG. 8 illustrates a portion of an exemplary multimedia system such as illustrated in FIG. 6. Memory 691 couples to the memory controller 829 and the FIFO 641 of the "Vidsyst" decoder 619. The video decoder 621 and system decoder 622 are contained within the "Vidsyst" decoder 619. The A/V sync circuit 620, illustrated in greater detail by FIGS. 5A–5B, is contained within the "Vidsyst" decoder 619.

Memory 691 temporarily stores the encoded/compressed audio data and the encoded compressed video data received from a host processor (not shown) within the memory portion 870. Memory portion 870 is large enough to store a number of MPEG type encoded video frames and a number of MPEG encoded audio data packets. Encoded/compressed audio data may be read from memory portion 870 by the "Vidsyst" decoder 619 at the appropriate time to be sent to the audio decoder 627 through FIFO 641 and Audio control/FIFO 830. Encoded compressed video data may be read from memory portion 870 by the "Vidsyst" decoder 619 at the appropriate time to decode and decompress the encoded/compressed video data into decoded/decompressed video data which may then be temporarily stored back into memory 961. Memory 961 temporarily stores a frame of decoded/decompressed video data in each memory portion 871 through 874.

The memory controller 829 commands the memory control logic 875 to read and write data into the addressable memory locations within the memory 691. Memory control logic 875 within memory 691 may couple addressable storage locations within the memory 691 with the "Vidsyst" decoder 619 through data bus 824 and FIFO 641.

As described above, depending upon the results of the computations made by the A/V sync circuit 620 to detect and out of sync condition, the audio playback and the video display of images may be resynchronized by repeating or skipping video frames or fractions thereof or by skipping or delaying audio data packets or fractions thereof.

To skip frames of the video display of images, it is preferable that encoded/compressed video data frames be skipped in order to resynchronize the video display with the audio playback. To repeat frames of the video display of images, it is preferable that decoded/decompressed video data frames be repeated in order to resynchronize the video display with the audio playback. Alternatively packets of encoded/compressed audio data may be skipped or delayed in order to resynchronize the video display with the audio playback.

To skip encoded/compressed video data frames, an appropriate type of frame needs to be detected. As the system decoder 622 parses the encoded/compressed bit stream into encoded/compressed video data, encoded/compressed audio data, and timing information, it signals the type of video frames, such as I-type, P-type, or B-type, to the memory controller 829 through signal lines 851. Thus, memory controller 829 knows what type of encoded video frames and the addresses where each type may be found in the address space of the addressable storage locations within memory 691. Upon receiving a signal from A/V sync circuit 620, such as signals 545–548 in FIGS. 5A–5B, which indicate an out of sync condition, memory controller 829 determines if there may be an appropriate type of encoded/compressed video frame type within memory 691 which may be skipped. If the memory controller 829 knows of a type which may be skipped, it modifies the addressing sequence provided to memory 691 in order to skip the desired encoded/compressed frame. The modification of the addressing sequence may be as simple as selecting a different starting address. It can be appreciated that other modifications to a given address sequence would accommodate skipping a stored encoded/compressed frame.

If the memory controller 829 knows there are no types of encoded frames within memory 691 which may be skipped, it searches for a type which may be skipped in the received encoded/compressed bit stream as it is parsed by the system decoder 622. After a predetermined time if no type of encoded/compressed frame which may be skipped has been found within the encoded/compressed bit stream, the memory controller signals, through signal line 850, for an interrupt request to cause software to perform the resynchronization.

To repeat decoded/decompressed video data frames, memory controller 829 simply commands memory 691 to repeat a sequence of memory addresses for addressable storage locations within memory 691 which contain the same frame of video data. The selected decoded/decompressed video data frame to be repeated, is read a second time from memory 691 and sent to the Video Decoder 621 through FIFO 641.

To skip encoded/compressed audio data, memory controller 829 may selectively skip a sequence of memory addresses or periodically skip memory addresses to more smoothly skip encoded/compressed audio data. Skipping a sequence of addresses of encoded/compressed audio data is similar to skipping a sequence of addresses of encoded/compressed video data as described above. Preferably, the audio controller/FIFO 830 may speed up the generation of decoded/decompressed audio data by the audio decoder 627 in order to synchronize the video display of images with the audio playback. Speeding up the generation of decoded/decompressed audio data may be less perceptible to human beings than skipping encoded/compressed audio data. Audio controller/FIFO 830 may more frequently request encoded/compressed audio data from memory 691 and provide it more quickly to audio decoder 627 to speed up the generation of decoded/decompressed audio data.

To delay encoded/compressed audio data, audio controller/FIFO 830 request encoded/compressed audio data from memory 691 less frequently and provides the encoded/compressed audio data a little more slowly in order to cause audio decoder 627 to slow down the generation of decoded/decompressed audio data.

MULTIMEDIA SYSTEM

An exemplary multimedia application of the present invention is illustrated in FIG. 6. A multimedia digital system 600, such as a multimedia computer, has a main system board 610 which is internally coupled to CDROM reader 611, and audio/video decoder 612. The multimedia digital system 600 may be externally coupled to an encoding system which may consist of image source 601 and encoder 602, and may be coupled to external display devices such as digital display 605, CRT monitor 606, or television 607. Initially an encoding is performed on data from some source providing image data. Examples of sources which provide image data are a motion video camera, a TV monitor, a computer, a scanner, and a still camera. Regardless of the source, image data may be provided on bus 635 into an encoder 602. In FIG. 6, an image 603 is read by image source 601, such as a motion video camera, and converted into a stream of data on bus 635 to be encoded by encoder 602. Depending upon the type of standard used, the encoder 602 may be an MPEG I encoder, an MPEG II encoder, a JPEG encoder, or some other type of encoder which generates encoded/compressed data. After the image data has been encoded, it may be coupled to the processor directly from the encoder 602 or it may be written onto compact disk read only memory (CDROM) 604. If written onto CDROM 604, a disk must be inserted into a CDROM reader 611 in order to couple the encoded/compressed data recorded from the encoder 602 to the processor 613.

Processor 613 may be a standard microprocessor such as an Intel 80486 or a dedicated type of processor. The processor 613 may store the encoded/compressed data into system memory 614 to be later read and placed onto the system bus 615 or it may directly couple the encoded/compressed data onto the system bus 615. The system bus 615 may be an ISA bus, PCI bus, or other standard computer bus or some type of dedicated bus. The encoded/compressed data stream on system bus 615 is coupled to an audio/video decoder system 612. The encoded/compressed data on the system bus 615 is coupled to the "Vidsyst" decoder 619. Within the vidsyst decoder 619, the system decoder 622 parses the encoded/compressed data into encoded/compressed video data, encoded/compressed audio data, and timing control signals. The system decoder 622 is coupled to the audio/video sync circuit 620 to convey timing control signals. The system decoder 622 may directly couple to an audio decoder 627 to convey the encoded/compressed audio data or it may indirectly couple to the audio decoder 627 through FIFO 641 and memory 691 which provides temporary storage for frames of the encoded/compressed audio data before being conveyed to the audio decoder 627. The system decoder 622 may also be directly coupled to a video decoder 621 to convey the encoded/compressed video data. Alternatively, the system decoder 622 may indirectly couple to the video decoder 621 through FIFO 642 and memory 691 which provides temporary storage for frames of the encoded/compressed video data before being conveyed to the video decoder 621. In any case, control signals 631 for FIFO 641, control signals 630 for FIFO 642, and control signals for memory 691 provide the capability of skipping or repeating either frames or fractions thereof of encoded/compressed video data, packets or fractions thereof of encoded/compressed audio data, or frames or fractions thereof of decoded/decompressed video data.

If there is a need to skip more than a number of predetermined frames within the memory 691 or FIFO 642, an interrupt signal may be generated by the Vidsyst decoder 619 to restart the MPEG bit stream from the beginning of the sequence layer to re-align the audio/video data stream. If there is a need to repeat more than a number of predetermined frames an interrupt signal may also be generated in order to restart the MPEG bit stream from the beginning of the sequence layer to re-align the audio/video data stream. In the case of FIG. 5A, either multiple repeat signal 546 or the multiple skip signal 545 may generate an interrupt request which is sent to the CPU 613. Other control signals for the FIFO 641 and 642 and memory 691 emanate from the controller 629 which are not shown.

The video decoder 621 within the vidsyst decoder 619 functions to decompress/decode the encoded/compressed video data into a decoded/decompressed video data stream which is provided on bus 626. The graphics controller 625 receives the decoded/decompressed video data stream and in conjunction with the video display memory 624 scans an image onto either the digital display 605 or the CRT video monitor 606.

The codec 628 receives the decoded/decompressed video data stream and converts it into a data format such YUV or RGB which is acceptable to a television 607. The codec 628 presently would convert the decoded/decompressed video data stream into an NTSC or PAL format for display on an NTSC or PAL television however future format conversions may be used as well.

The audio decoder 627 decoder/decompresser the encoded/compressed audio data stream into an decoded/decompressed audio analog signals to be conveyed to an analog amplification device (not shown) or to drive speakers 608 directly. Alternately, the audio decoder 627 decoder/decompresser the encoded/compressed audio data stream into a decoded and decompressed digital audio data stream to be conveyed to a digital amplification device (not shown) over busses 609.

The audio/video sync circuit 620, described above with reference to FIG. 5A, receives the timing information (VPTS,APTS,SCR) parsed by the system decoder 622 from the encoded/compressed bit stream. In response to the timing information, the audio/video sync circuit 620 indirectly and directly generates control signals for FIFOs 641, 642, memory 691 and video decoder 621 in order to skip or repeat one or more frames or fractions thereof of encoded/compressed or decoded/decompressed audio or video data. In order to repeat video frames or fractions thereof, the audio/video sync circuit 620 causes the video decoder 621 to generate the same output for a given period of time through control signals busses 630, 632. In order to skip video frames or fractions thereof the audio/video sync circuit 620 causes the FIFO 642 and memory 691 to skip a predetermined number of addresses in order to provide the appropriate encoded/compressed bit stream to the video decoder 621.

Similarly in order to skip audio data or fractions thereof the audio/video sync circuit 620 causes the FIFO 641 and memory 691 to skip a predetermined number of addresses in order to provide the appropriate encoded/compressed bit stream to the video decoder 621.

The video basic input/output operating system (VBIOS) 623 initializes the graphics controller 625 and the vidsyst decoder 619. The VBIOS 623 may have software coded instructions for the vidsyst decoder 619 and graphics controller 625. The instructions for the vidsyst decoder 619 perform freeze, step, fast forward, and other commands for the encoded/compressed data in a similar manner as a VHS tape player/recorder. These instructions may cause the audio/video sync circuit 620 to generate control signals which further cause the FIFOs 642, 641 and video decoder 621 therein and audio decoder 627 to skip or repeat a combination of frames of video or audio data or fractions thereof.

COMBINED VIDEO DATA

FIG. 6 illustrates one method of how graphics data and encoded data share a bus 615 and display devices 605–607. In this case graphics controller 625 has an internal multiplexer (not shown) to combine the decoded/decompressed video data stream on bus 626 and the graphics data on bus 615 to be displayed on the same display device monitor 606 or digital display 605. In this case the graphics data may provide the background window and other windows on the display while the decoded/decompressed data would be displayed within another window on the same display. TV monitor may have both data types combined on the one display as well.

Figure 7A:
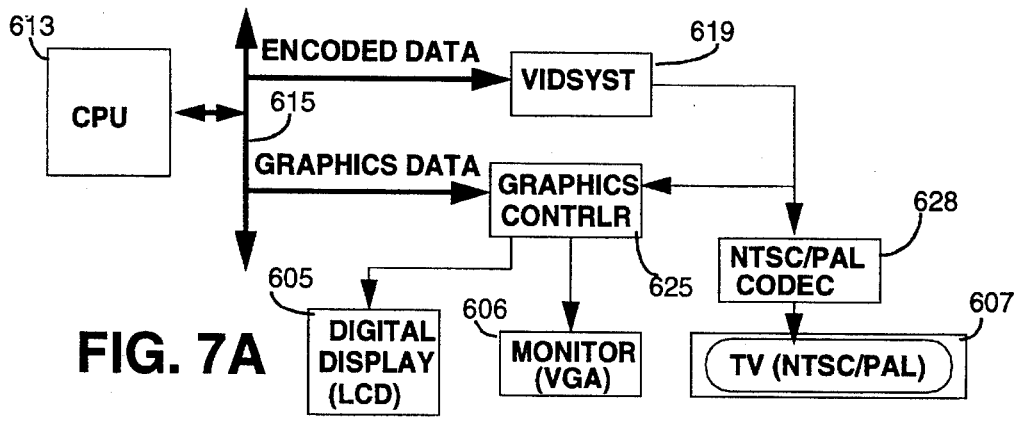
FIGS. 7A–7C illustrate optional configurations of the present invention for combining graphics and encoded data transfer.

FIG. 7A illustrates a simplified block diagram of that of FIG. 6. In FIGS. 6 and 7A, the bus 615 may be time multiplexed between the encoded data being driven from the bus 615 into the vidsyst decoder 619 and graphics data being driven from the bus 615 into the graphics controller 625. In FIG. 7A and FIG. 6, the graphics controller 625 contains, an internal multiplexer to multiplex the graphics data and the decoded/decompressed video data on the same display device.

Figure 7B:
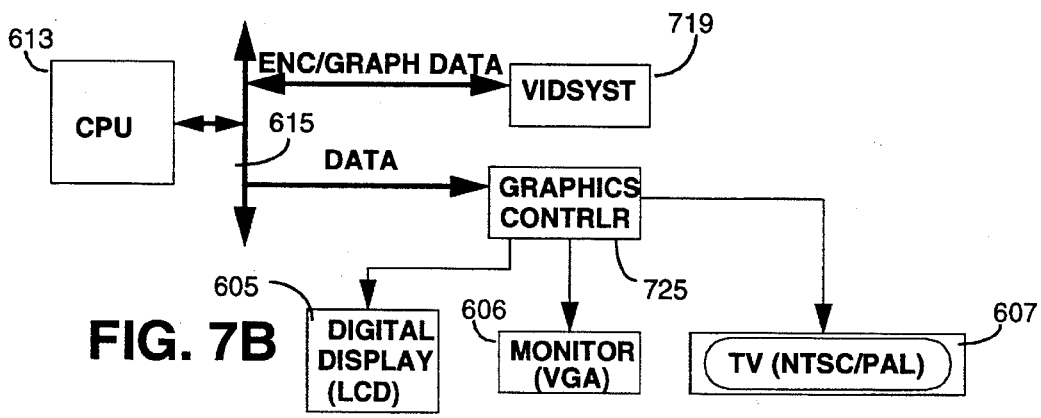

FIG. 7B illustrates another alternative for displaying graphics data and decoded/decompressed video data on the same display device. In this case bus 615 time multiplexes encoded data, graphics data, and decoded/decompressed video data generated from the encoded data. The encoded data is placed on the bus 615 and received by the vidsyst decoder 719 having a bidirectional port. The vidsyst decoder 719 decodes/decompresses the encoded data to drive decoded/decompressed data back onto bus 615. Graphics controller 725 receives both graphics data and decoded/decompressed data such that it may be internally multiplexed together for near simultaneously display on each of digital display 605, monitor 606, or TV 607. In this case graphics controller 725 contains more circuitry in order to not only properly multiplex the two data types but also properly convert the graphics data and the decoded/decompressed video data into an NTSC or PAL signal for display onto TV 607.

Figure 7C:
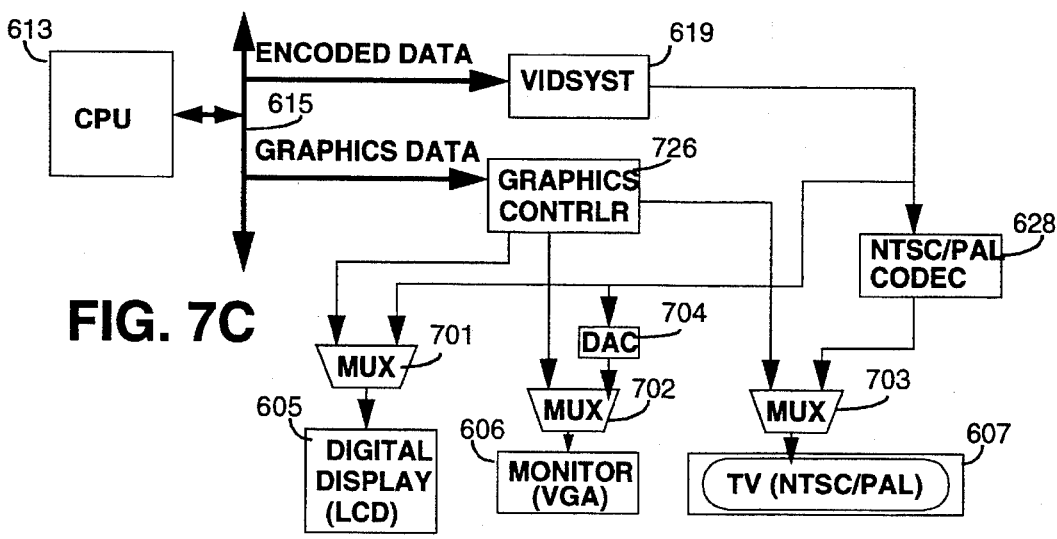

FIG. 7C illustrates another alternative for displaying graphics data and decoded/decompressed video data on the same display device using external components. Similar to FIG. 7A, bus 615 time multiplexes encoded data and graphics data. Vidsyst 619 receives the encoded data from bus 615 and generates a decoded/decompressed video data stream which is selectively coupled as pixel data to digital display 605 by multiplexer 701, selectively coupled to monitor 606 as an analog signal through digital analog converter 704 and multiplexer 702, and selectively coupled to TV 607 as an NTSC or PAL signal through NTSC/PAL Codec 628 and multiplexer 703. Graphics controller 726 receives graphics data from bus 615 and provides pixel data for digital display 605, an analog graphics signal for monitor 606, NTSC/PAL signal for TV 607, timing/control signals for displays 605–607 and multiplexer control signals for multiplexers 701–703. Using the multiplexers 701–703 the graphics controller 726 properly generates the multiplexer control signals thereby timing when graphics data and the decoded/decompressed video data from the vidsyst decoder 619 is displayed on any of displays 605–607. Internal multiplexers within graphics controllers 625 and 725 operate in a similar fashion as external multiplexers 701–703.

While the preferred embodiment and various alternative embodiments of the invention have been disclosed and described in detail herein, it will be obvious to those skilled in the art that various changes in form and detail may be made therein without departing from the spirit and scope thereof.

What is claimed is:

1. A multimedia system having an audio/video decoding/decompressing circuit for decoding an encoded/compressed data stream, the audio/video decoding/decompressing circuit comprising:

a parser for separating the encoded/compressed data stream into encoded/compressed audio data, encoded/compressed video data, an audio time value, and a video time value, wherein each of the audio time value and the video time value comprise a time stamp for the encoded/compressed audio data and the encoded/compressed video data respectively;

a memory having addressable storage, coupled to the parser, addressing addressable storage to selectively store and read the encoded/compressed audio data, the encoded/compressed video data, or decoded/decompressed video data to and from addressable storage;

a first decoder, coupled to the memory, for decoding the encoded/compressed video data and generating the decoded/decompressed video data; and a synchronizer, coupled to the first decoder and the memory, for comparing the video time value with the audio time value and when the comparison exceeds a predetermined threshold, substantially synchronizing the generation of the decoded/decompressed video data by the first decoder with the addressing of addressable storage by the memory.

2. The audio/video decoding circuit of claim 1 wherein the synchronizer determines that the video time value exceeds the audio time value by the predetermined threshold, and a sequence of addressing addressable storage containing decoded/decompressed video data by the memory is modified by repeating a sequence of addresses to substantially synchronize the generation of the decoded/decompressed video data by the first decoder with the addressing of addressable storage by the memory.

3. The audio/video decoding circuit of claim 1 wherein the synchronizer determines that the audio time value exceeds the video time value by the predetermined threshold, and a sequence of addressing addressable storage containing encoded/compressed video data by the memory is modified by skipping a sequence of addresses to substantially synchronize the generation of the decoded/decompressed video data by the first decoder with the addressing of addressable storage by the memory.

4. The audio/video decoding circuit of claim 1 further comprising a second decoder, coupled to the memory, for decoding the encoded/compressed audio data into decoded/decompressed audio data.

5. The audio/video decoding circuit of claim 1 further comprising a graphics controller, coupled to the first decoder and a video monitor, for displaying the decoded/decompressed video data as an image on the video monitor.

6. The audio/video decoding circuit of claim 1 further comprising a graphics controller, coupled to the first decoder and a digital display, for displaying the decoded/decompressed video data as an image on the digital display.

7. The audio/video decoding circuit of claim 1 further comprising a television signal encoder, coupled to the first decoder and a television display, for generating television data from the decoded/decompressed video data and displaying the television data as an image on the television display.

8. The audio/video decoding circuit of claim 4 further comprising a digital to analog converter, coupled to the second decoder for generating an analog audio signal from the decoded/decompressed audio data.

9. The audio/video decoding circuit of claim 8 further comprising an audio amplifier, coupled to the digital to analog converter, for amplifying the magnitude of the analog audio signal.

10. A method for determining if synchronization of audio playback having a plurality of compressed and decompressed audio data packets, with video display images having a plurality of compressed and decompressed video data frames, is required, the method for determining comprising the steps of:

determining a time difference between receiving an audio time value and a video time value within a data stream of interspersed compressed audio data packets and compressed video data frames;

adding the time difference to the audio time value to generate a normalized audio time value; and comparing the normalized audio time value with the video time value to determine whether the video display is lagging the audio playback and requires synchronization.

11. The method of claim 10 further comprising the step of:

skipping M compressed video data frames to substantially synchronize a compressed video data frame with a compressed audio data packet when it is determined in the first comparing step that the video display is lagging the audio playback by more than a lag threshold.

12. The method of claim 11 wherein the lag threshold is three frames of a video frame display time and the value of M is three.

13. The method of claim 11 wherein the lag threshold is one frame of a video frame display time and the value of M is one.

14. The method of claim 11 wherein the lag threshold is one half of a video frame display time and the value of M is one.

15. The method of claim 11 wherein the lag threshold is one half of a video frame display time and the value of M is one half.

16. The method of claim 10 further comprising the step of:
comparing the normalized audio time value with the video time value to determine whether the video display is leading the audio playback and requires synchronization.

17. The method of claim 16 further comprising the step of:
repeating N decompressed video data frames to substantially synchronize a decompressed video data frame with a decompressed audio data packet when it is determined in the second comparing step that the video display is leading the audio playback by more than a lead threshold.

18. The method of claim 17 wherein the lead threshold is three frames of a video frame display time and the value of N is three.

19. The method of claim 17 wherein the lead threshold is one frame of a video frame display time and the value of N is one.

20. The method of claim 17 wherein the lead threshold is one half of a video frame display time and the value of N is one.

21. The method of claim 17 wherein the lead threshold is one half of a video frame display time and the value of N is one half.

22. A method for determining if synchronization of video display images having a plurality of compressed and decompressed video data frames, with audio playback having a plurality of compressed and decompressed audio data packets, is required, the method for determining comprising the steps of:

determining a time difference between receiving a video time value and an audio time value within a data stream of interspersed compressed video data frames and compressed audio data packets;

adding the time difference to the video time value to generate a normalized video time value; and comparing the normalized video time value with the audio time value to determine whether the video display is lagging the audio playback and requires synchronization.

23. The method of claim 22 further comprising the step of:
skipping M compressed video data frames to substantially synchronize a compressed video data frame with a compressed audio data packet when it is determined in the first comparing step that the video display is lagging the audio playback by more than a lag threshold.

24. The method of claim 23 wherein the lag threshold is two and one half frames of a video frame display time and the value of M is three.

25. The method of claim 23 wherein the lag threshold is one frame of a video frame display time and the value of M is one.

26. The method of claim 23 wherein the lag threshold is one half of a video frame display time and the value of M is one.

27. The method of claim 23 wherein the lag threshold is one half of a video frame display time and the value of M is one half.

28. The method of claim 22 further comprising the step of:
comparing the normalized video time value with the audio time value to determine whether the video display is leading the audio playback and requires synchronization.

29. The method of claim 28 further comprising the step of:
repeating N decompressed video data frames to substantially synchronize a decompressed video data frame with a decompressed audio data packet when it is determined in the second comparing step that the video display is leading the audio playback by more than a lead threshold.

30. The method of claim 29 wherein the lead threshold is three frames of a video frame display time and the value of N is three.

31. The method of claim 29 wherein the lead threshold is one frame of a video frame display time and the value of N is one.

32. The method of claim 29 wherein the lead threshold is one half of a video frame display time and the value of N is one.

33. The method of claim 29 wherein the lead threshold is one half of a video frame display time and the value of N is one half.

34. An audio/video synchronization circuit for substantially synchronizing video display images having a plurality of compressed and decompressed video data frames, with audio playback having a plurality of compressed and decompressed audio data packets, the audio/video synchronization circuit comprising:

a counter initialized to an audio time value upon receiving the audio time value within an audio/video encoded data stream and incremented by a clock to generate a normalized audio time value, the audio time value comprising a time stamp;

a memory means for storing a video time value upon receiving the video time value within the audio/video encoded data stream, the video time value also comprising a time stamp; and a subtracter coupled to the memory means,
for subtracting the video time value stored in said memory means from the normalized audio time value to generate a time drift value,
for comparing the time drift value with a positive lag threshold to determine whether the video display is lagging the audio playback by the lag threshold and when exceeding the lag threshold skipping M compressed video data frames to substantially synchronize a compressed video data frame with a compressed audio data packet, and
for comparing the time drift value with the negative value of a lead threshold to determine whether the video display is leading the audio playback by the lead threshold and when exceeding the lead threshold repeating N decompressed video data frames to substantially synchronize a decompressed video data frame with a decompressed audio data packet.

35. The audio/video synchronization circuit of claim 34 wherein the lag threshold and lead threshold is three frames of a video frame display time and the value for M and N is three.

36. The audio/video synchronization circuit of claim 34 wherein the lag threshold and lead threshold is one frame of a video frame display time and the value for M and N is one.

37. The audio/video synchronization circuit of claim 34 wherein the lag threshold and lead threshold is one half of a video frame display time and the value for M and N is one.

38. The audio/video synchronization circuit of claim 34 wherein the lag threshold and lead threshold is one half of a video frame display time and the value for M and N is one half.

39. An audio/video synchronization circuit for substantially synchronizing video display images having a plurality of compressed and decompressed video data frames with audio playback having a plurality of compressed and decompressed audio data packets, the audio/video synchronization circuit comprising:

a frequency divider for selectively dividing the frequency of a clock in response to a display frame rate to generate a divided frequency clock;

a counter, coupled to the frequency divider, initialized to an audio time value upon receiving the audio time value within an audio/video encoded data stream, and incremented by the divided frequency clock to generate a normalized audio time value., wherein the audio time value comprises a time stamp;

a first memory means for storing a video time value upon receiving the video time value within the audio/video encoded data stream, wherein the video time value also comprises a time stamp;

a second memory means for storing a threshold value; and an arithmetic means selectively coupled to the first memory means, the second memory means, and the counter, for selectively adding or subtracting the threshold value and the video time value to generate a first result and selectively adding or subtracting the normalized audio time value and the first result to generate a second result, wherein the second result indicates that the video display lags the audio playback by more than the threshold value; and a synchronizer for causing M compressed video data frames to be skipped in order to substantially synchronize a decompressed video data frame with a decompressed audio data packet.

40. The audio/video synchronization circuit of claim 39 wherein the audio time value and video time value have selective bits truncated, such that the audio time value and video time value are N bits wide to represent a narrower range of values, the frequency divider is further responsive to the selected bits of the audio time value and video time value being truncated, and the counter and arithmetic means are N+1 bits wide.

41. The audio/video synchronization circuit of claim 39 wherein the type of compressed video data frames that are caused to be skipped are MPEG encoded video frames within the audio/video encoded data stream.

42. The audio/video synchronization circuit of claim 39 wherein the type of compressed video data frames that are skipped is a B-type MPEG encoded video frame or a P-type MPEG encoded video frame which immediately precedes an I-type MPEG encoded video frame within the audio/video encoded data stream.

43. The audio/video synchronization circuit of claim 39 wherein the type of compressed video data frames that are desirable to skip is a B-type MPEG encoded video frame or a P-type MPEG encoded video frame which immediately precedes an I-type MPEG encoded video frame within the audio/video encoded data stream, and when the desirable compressed video data frames that are desirable to skip are not contained within the audio/video encoded data stream for a predetermined period of time, the audio/video synchronization circuit generates an interrupt.

44. The audio/video synchronization circuit of claim 39 wherein the second result indicates that the video display lags the audio playback by more than the threshold value, the audio video synchronization circuit signals to skip M compressed video data frames of a B-type MPEG encoded video frame or a P-type MPEG encoded video frame which immediately precedes an I-type MPEG encoded video frame within the audio/video encoded data stream to substantially synchronize a decompressed video data frame with a decompressed audio data packet, and when B-type MPEG encoded video frames and P-type MPEG encoded video frames which immediately precede an I-type MPEG encoded video frame to be skipped are unavailable for a predetermined period of time within the audio/video encoded data stream, the audio video synchronization circuit causes a delay of D compressed audio data packets.

45. The audio/video synchronization circuit of claim 39 wherein the threshold is three frames of a video frame display time and M is three.

46. The audio/video synchronization circuit of claim 39 wherein the threshold is one frame of a video frame display time and M is one.

47. The audio/video synchronization circuit of claim 39 wherein the threshold is one half of a video frame display time and M is one.

48. The audio/video synchronization circuit of claim 39 wherein the threshold is one half of a video frame display time and M is one half.

49. The audio/video synchronization circuit of claim 39 wherein the second result indicates that the video display leads the audio playback.

50. The audio/video synchronization circuit of claim 49 wherein the second result indicates that the video display leads the audio playback by more than the threshold value, and the audio video synchronization circuit causes N decompressed video data frames to be repeated in order to substantially synchronize a decompressed video data frame with a decompressed audio data packet.

51. The audio/video synchronization circuit of claim 50 wherein the threshold is three frames of a video frame display time and N is three.

52. The audio/video synchronization circuit of claim 50 wherein the threshold is one frame of a video frame display time and N is one.

53. The audio/video synchronization circuit of claim 50 wherein the threshold is one half of a video frame display time and N is one.

54. The audio/video synchronization circuit of claim 50 wherein the threshold is one half of a video frame display time and N is one half.

55. An audio/video synchronization circuit for substantially synchronizing video display images having a plurality of compressed and decompressed video data frames with audio playback having a plurality of compressed and decompressed audio data packets, the audio/video synchronization circuit comprising:

a frequency divider for selectively dividing the frequency of a clock in response to a display frame rate to generate a divided frequency clock;

a counter, coupled to the frequency divider, initialized to a video time value upon receiving the video time value within an audio/video encoded data stream, and incremented by the divided frequency clock to generate a normalized video time value, wherein the video time value comprises a time stamp;

a first memory means for storing an audio time value upon receiving the audio time value within the audio/video encoded data stream, wherein the audio time value also comprises a time stamp;

a second memory means for storing a threshold value; and an arithmetic means selectively coupled to the first memory means, the second memory means, and the counter, for selectively adding or subtracting the threshold value and the audio time value to generate a first result and selectively adding or subtracting the normalized video time value and the first result to generate a second result, wherein the second result indicates that the video display lags the audio playback by more than the threshold value; and a synchronization circuit for causing M compressed video data frames to be skipped in order to substantially synchronize a decompressed video data frame with a decompressed audio data packet.

56. The audio/video synchronization circuit of claim 55 wherein the audio time value and video time value have selective bits truncated, such that the audio time value and video time value are N bits wide to represent a narrower range of values, the frequency divider is further responsive to the selected bits of the audio time value and video time value being truncated, and the counter and arithmetic means are N+1 bits wide.

57. The audio/video synchronization circuit of claim 55 wherein the threshold is three frames of a video frame display time and M is three.

58. The audio/video synchronization circuit of claim 55 wherein the threshold is one frame of a video frame display time and M is one.

59. The audio/video synchronization circuit of claim 55 wherein the threshold is one half of a video frame display time and M is one.

60. The audio/video synchronization circuit of claim 55 wherein the threshold is one half of a video frame display time and M is one half.

61. The audio/video synchronization circuit of claim 55 wherein the second result indicates that the video display leads the audio playback.

62. The audio/video synchronization circuit of claim 61 wherein the second result indicates that the video display leads the audio playback by more than the threshold value, and the audio video synchronization circuit causes N decompressed video data frames to be repeated in order to substantially synchronize a decompressed video data frame with a decompressed audio data packet.

63. The audio/video synchronization circuit of claim 62 wherein the threshold is three frames of a video frame display time and N is three.

64. The audio/video synchronization circuit of claim 62 wherein the threshold is one frame of a video frame display time and N is one.

65. The audio/video synchronization circuit of claim 62 wherein the threshold is one half of a video frame display time and N is one.

66. The audio/video synchronization circuit of claim 62 wherein the threshold is one half of a video frame display time and N is one half.

67. A multimedia system for reading, decoding, and decompressing encoded audio/video data into video data for display on a plurality of display types and into audio data for reproduction on a plurality of sound reproduction devices, the multimedia system comprising:

a reader, receiving the encoded audio/video data, for reading the encoded audio/video data and generating a first encoded audio/video bit stream;

a first memory for storing the first encoded audio/video bit stream;

a processor, coupled to the reader, the first memory, and a system bus, for receiving the first encoded audio/video bit stream and writing first encoded audio/video bit stream into and a first memory, and reading the first encoded audio/video bit stream from the first memory being stored therein and outputting the first encoded audio/video bit stream onto the bus; and an audio/video decoding circuit, coupled to the system bus, for receiving the first encoded audio/video bit stream and for decoding and decompressing the encoded audio/video data into video data and audio data, the audio/video decoding circuit comprising:

a parser for separating the encoded data stream into encoded audio data, encoded video data, an audio time value, and a video time value, the audio time value and the video time value comprising a time stamp;

a second memory having addressable storage, coupled to the parser, coupled to the parser, addressing addressable storage to selectively store and read the encoded audio data, the encoded video data, or decoded video data to and from addressable storage;

a first decoder, coupled to the second memory, for decoding and decompressing encoded video data and generating decompressed video data in response to the video time value;

a synchronizing circuit, coupled to the first decoder and the second memory, for comparing the video time value with the audio time value and when the comparison exceeds a predetermined threshold, substantially synchronizing the generation of the decompressed video data by the first decoder with the addressing of addressable storage by the second memory; and a second decoder, coupled to the second memory, for decoding and decompressing encoded audio data to generate decompressed audio data.

68. The multimedia system of claim 67 wherein the synchronizer determines that the video time value exceeds the audio time value by the predetermined threshold, and a sequence of addressing addressable storage containing decoded/decompressed video data by the memory is modified by repeating a sequence of addresses to substantially synchronize the generation of the decoded/decompressed video data by the first decoder with the addressing of addressable storage by the memory.

69. The multimedia system of claim 67 wherein the synchronizer determines that the audio time value exceeds the video time value by the predetermined threshold, and a sequence of addressing addressable storage containing encoded video data by the memory is modified by skipping a sequence of addresses to substantially synchronize the generation of the decoded/decompressed video data by the first decoder with the addressing of addressable storage by the memory.

70. The multimedia system of claim 67 further comprising a graphics controller, coupled to the first decoder and a video monitor, for displaying the decoded/decompressed video data as an image on the video monitor.

71. The multimedia system of claim 67 further comprising a graphics controller, coupled to the first decoder and a digital display, for displaying the decoded/decompressed video data as an image on the digital display.

72. The multimedia system of claim 67 further comprising a television signal encoder, coupled to the first decoder and a television display, for generating television data from the decoded/decompressed video data and displaying the television data as an image on the television display.

73. The multimedia system of claim 67 further comprising a digital to analog converter, coupled to the second decoder for generating an analog audio signal from the decoded/decompressed audio data.

74. The multimedia system of claim 67 further comprising an audio amplifier, coupled to the digital to analog converter, for amplifying the magnitude of the analog audio signal.

* * * * *